(12) United States Patent
Waters et al.

(10) Patent No.: US 10,704,935 B2
(45) Date of Patent: Jul. 7, 2020

(54) FLUID FLOW DETECTOR WITH TETHERED DRAG BLOCK

(71) Applicant: Buoy Labs. Inc., Santa Cruz, CA (US)

(72) Inventors: Keri Waters, Santa Cruz, CA (US); Layne Clemen, San Diego, CA (US)

(73) Assignee: Buoy Labs, Inc., Santa Cruz, CA (US)

( * ) Notice: Subject to any disclaimer, the term of this patent is extended or adjusted under 35 U.S.C. 154(b) by 275 days.

(21) Appl. No.: 15/831,271

(22) Filed: Dec. 4, 2017

(65) Prior Publication Data

US 2018/0356265 A1    Dec. 13, 2018

Related U.S. Application Data

(60) Provisional application No. 62/429,828, filed on Dec. 4, 2016.

(51) Int. Cl.
*G01F 1/28*    (2006.01)
*G01L 1/04*    (2006.01)

(52) U.S. Cl.
CPC . *G01F 1/28* (2013.01); *G01L 1/04* (2013.01)

(58) Field of Classification Search
CPC ..... F16L 2101/50; F16L 2101/60; G01F 1/28; G01M 3/005; G01M 3/2823; G01M 3/02; G01M 3/22; G01M 3/246
See application file for complete search history.

(56) References Cited

U.S. PATENT DOCUMENTS

| 1,919,546 | A | * | 7/1933 | Fletcher | G01B 5/12 |
| | | | | | 73/37.9 |
| 2,909,975 | A | * | 10/1959 | Ulrich | G03B 37/005 |
| | | | | | 396/19 |
| 3,114,261 | A | | 12/1963 | Dillon et al. | |
| 3,147,620 | A | * | 9/1964 | Stapler | G01F 1/28 |
| | | | | | 73/861.74 |

(Continued)

FOREIGN PATENT DOCUMENTS

| CN | 105758470 A | 7/2016 |
| DE | 19601609 A1 | 7/1997 |

(Continued)

OTHER PUBLICATIONS

Machine Translation of JP 2003-130696 A1 which originally published on May 8, 2008. (Year: 2008).*

(Continued)

*Primary Examiner* — David A Rogers
(74) *Attorney, Agent, or Firm* — Shumaker & Sieffert, P.A.

(57) ABSTRACT

A method and system for monitoring, measuring and affecting fluid flow within a pipe element of a plumbing system. One version is attached proximate to, and installed through, a hose bib of a building water plumbing system. The device includes water flow sensing and monitoring modules that are coupled to a drag block. The drag block may be configured to be deployed and deformed within a fluid pipe as directed by a controller or by manual control. The controller is (Continued)

optionally communicatively or bi-directionally communicatively coupled to an external receiver or transceiver by wireless means. Data collected by the device is analyzed to detect leaks in the plumbing system. The device may include a power source, such as an electrical battery, a solar energy collector, and/or a wind energy collector.

18 Claims, 18 Drawing Sheets

(56) References Cited

U.S. PATENT DOCUMENTS

| | | | | |
|---|---|---|---|---|
| 3,381,714 | A | * | 5/1968 | Johnson ............. F16L 55/10 138/97 |
| 3,696,660 | A | * | 10/1972 | Hubbard ............. E21B 47/1025 73/40.5 R |
| 3,719,073 | A | | 3/1973 | Mahon |
| 3,875,606 | A | * | 4/1975 | Landers ............... B08B 9/0553 15/104.061 |
| 3,903,730 | A | * | 9/1975 | Matthews, Jr. ....... G01M 3/005 73/40.5 R |
| 4,016,748 | A | * | 4/1977 | Boyens ................ G01H 3/00 73/40.5 R |
| 4,197,809 | A | | 4/1980 | Johnson |
| 4,291,583 | A | | 9/1981 | Buike |
| 4,368,646 | A | * | 1/1983 | Rogg ................... G01F 1/24 73/861.54 |
| 4,413,370 | A | * | 11/1983 | Payne .................. B08B 9/0557 15/104.061 |
| 4,485,668 | A | * | 12/1984 | Hudson ............... G01M 3/246 73/40.5 A |
| 4,509,222 | A | * | 4/1985 | Knapp ................. B08B 9/0557 15/104.061 |
| 4,720,884 | A | * | 1/1988 | Ralls ................... B08B 9/0553 15/104.061 |
| 4,767,603 | A | * | 8/1988 | Byrd ................... F16L 55/38 15/104.05 |
| 4,894,539 | A | * | 1/1990 | Hurst ................... G01M 3/22 250/303 |
| 5,005,426 | A | | 4/1991 | Lew |
| 5,084,764 | A | * | 1/1992 | Day ..................... G01M 3/005 348/84 |
| 5,419,203 | A | * | 5/1995 | Carmichael .......... G01F 1/26 73/861.58 |
| 5,500,882 | A | | 3/1996 | Eifert |
| 5,528,938 | A | * | 6/1996 | Sano .................... G01B 5/02 73/597 |
| 5,625,917 | A | * | 5/1997 | Hawkins ............. B08B 9/0553 15/104.061 |
| 5,790,476 | A | * | 8/1998 | Stenstrom ............ E03F 7/00 367/120 |
| 5,931,184 | A | * | 8/1999 | Armenia .............. F16L 39/005 137/312 |
| 6,155,102 | A | | 12/2000 | Toma et al. |
| 6,314,795 | B1 | * | 11/2001 | Ingham ............... G01M 3/2823 73/49.1 |
| 6,401,525 | B1 | * | 6/2002 | Jamieson ............. G01M 3/005 73/1.25 |
| 6,672,154 | B1 | | 1/2004 | Yamagishi et al. |
| 6,715,370 | B2 | * | 4/2004 | Tasca .................. F16L 55/38 73/865.8 |
| 6,931,952 | B2 | * | 8/2005 | Rantala ............... G01L 5/008 73/431 |
| 6,970,808 | B2 | | 11/2005 | Abhulimen et al. |
| 7,000,463 | B1 | | 2/2006 | Shajii et al. |
| 7,058,521 | B2 | * | 6/2006 | Kowal ................. G01F 15/06 702/45 |
| 7,202,800 | B2 | | 4/2007 | Choi |
| 7,231,812 | B1 | * | 6/2007 | Lagare ................ G01M 3/005 15/104.05 |
| 7,274,996 | B2 | | 9/2007 | Lapinski et al. |
| 7,330,796 | B2 | | 2/2008 | Addink et al. |
| 7,331,215 | B2 | * | 2/2008 | Bond .................. F16L 55/46 73/40.5 A |
| 7,376,522 | B2 | | 5/2008 | Lapinski et al. |
| 7,412,336 | B2 | | 8/2008 | Larson |
| RE40,933 | E | * | 10/2009 | Young ................. A62C 35/68 340/606 |
| 7,657,347 | B2 | | 2/2010 | Campbell et al. |
| 7,905,831 | B2 | | 3/2011 | Noguchi et al. |
| 8,105,279 | B2 | | 1/2012 | Mernoe et al. |
| 8,359,996 | B2 | * | 1/2013 | Horn ................... F16L 55/1645 118/215 |
| 8,457,908 | B2 | | 6/2013 | Patel et al. |
| 8,531,303 | B2 | | 9/2013 | Pham et al. |
| 8,674,678 | B2 | * | 3/2014 | Hwang ................ G01V 3/10 324/66 |
| 8,800,384 | B2 | | 8/2014 | Wootten |
| 8,866,634 | B2 | | 10/2014 | Williamson et al. |
| 8,904,882 | B2 | | 12/2014 | Mertmann |
| 8,994,551 | B2 | | 3/2015 | Pitchford et al. |
| 9,019,120 | B2 | | 4/2015 | Broniak et al. |
| 9,078,050 | B2 | | 7/2015 | Makgill, Jr. et al. |
| 9,383,237 | B2 | | 7/2016 | Wiklund et al. |
| 9,410,833 | B1 | | 8/2016 | Leaders et al. |
| 9,552,143 | B2 | | 1/2017 | Javey et al. |
| 9,664,589 | B2 | | 5/2017 | Horne et al. |
| 9,702,731 | B2 | | 7/2017 | Gopinath |
| 10,184,822 | B2 | * | 1/2019 | Drachmann ......... G01F 25/0007 |
| 2003/0121338 | A1 | * | 7/2003 | Yates .................. B08B 9/053 73/865.8 |
| 2003/0150285 | A1 | * | 8/2003 | Tasca .................. F16L 55/38 73/865.8 |
| 2005/0102058 | A1 | * | 5/2005 | Reinsch .............. G01G 13/18 700/231 |
| 2005/0154345 | A1 | * | 7/2005 | Milleker ............. A61M 1/3663 604/67 |
| 2006/0168611 | A1 | | 7/2006 | Fima |
| 2008/0078252 | A1 | * | 4/2008 | Graber ................ G01F 1/60 73/861.16 |
| 2009/0128326 | A1 | | 5/2009 | Hong |
| 2011/0298635 | A1 | | 12/2011 | Yip |
| 2012/0097253 | A1 | * | 4/2012 | Eutsler ............... F16K 31/025 137/1 |
| 2014/0026644 | A1 | * | 1/2014 | Patel .................. E03B 7/071 73/40 |
| 2015/0198497 | A1 | * | 7/2015 | Merlob ............... G01M 3/00 73/592 |
| 2015/0377667 | A1 | | 12/2015 | Ahmad et al. |
| 2016/0313156 | A1 | | 10/2016 | Croft et al. |
| 2016/0345515 | A1 | * | 12/2016 | Helmsderfer ....... B05B 1/02 |
| 2017/0184429 | A1 | | 6/2017 | Kallesoe |
| 2017/0292893 | A1 | | 10/2017 | Bunker et al. |
| 2018/0279022 | A1 | | 9/2018 | Adler et al. |

FOREIGN PATENT DOCUMENTS

| | | | | |
|---|---|---|---|---|
| GB | 197195 | A | * 5/1923 | ............. G01F 1/26 |
| GB | 758023 | A | * 9/1956 | ............. G01F 1/26 |
| GB | 1566251 | A | * 4/1980 | ............. G01F 1/26 |
| JP | 2003130696 | A | 5/2003 | |
| KR | 101630768 | B1 | 6/2016 | |
| WO | 0066979 | A | 11/2000 | |
| WO | 2010146403 | A1 | 12/2010 | |
| WO | 2017118834 | A1 | 7/2017 | |
| WO | 2018027292 | A1 | 2/2018 | |
| WO | 2018074625 | A1 | 4/2018 | |

OTHER PUBLICATIONS

"What's New in Flow Technology", Control Global, 2011. (Year: 2011).*
"Hose Connection Gauges", Watts Regulator Company, 1998. (Year: 1998).*
"Buoy Installation Guide," Buoy Labs, Inc, Sep. 12, 2017, 12 pp.
"Buoy Quick Start Guide," Buoy Labs, Inc, Sep. 29, 2017, 20 pp.
"Resideo acquired Buoy!," accessed from https://www.buoy.ai/, on or about May 22, 2019, 9 pp.

(56) References Cited

OTHER PUBLICATIONS

"Buoy Labs," accessed from htttps://www.buoy.ai/ on or about May 22, 2019, 6 pp.
U.S. Appl. No. 29/612,637, filed Aug. 2, 2017, naming inventor Waters.
U.S. Appl. No. 15/973,360, filed May 7, 2018, naming inventors Waters et al.
U.S. Appl. No. 15/904,290, filed Feb. 23, 2018, naming inventors Waters et al.

* cited by examiner

FLUID FLOW DETECTOR WITH TETHERED DRAG BLOCK

APPLICATION

The present Nonprovisional Patent Application is a Continuation-in-Part Nonprovisional Patent Application to, and claims the priority date of, U.S. Provisional Patent Application Ser. No. 62/429,828 filed on Dec. 4, 2016 and titled WATER METER WITH TETHERED DRAG BLOCK ATTACHED VIA HOSE BIB. This U.S. Provisional Patent Application Ser. No. 62/429,828 is hereby incorporated by reference in its entirety and for all purposes into the present Nonprovisional Patent Application.

FIELD OF THE INVENTION

The present invention is in the field of fluid management, flow rate measurement, and leak detection, including but not limited to fluids consisting of or comprising water.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The management and control of fluids through channels of distribution networks, to include plumbing systems of buildings, is a need found ubiquitously among many domestic, commercial, industrial and civil installations. In addition, the detection of both fluid flow within plumbing systems and leaks therefrom is vital to most effectively managing the use, conservation, and cost of provision and delivery of many natural and chemical resources, including and not limited to water, beverages, petrochemicals and other natural and synthetic fluids.

Of particular note, the scope of the method of the present invention includes the fields of water management and leak detection. With ever increasing populations and limited water resources, water conservation has become a major issue. The State of California's current Governor Jerry Brown recently announced his state's first-ever mandatory water restrictions in an effort to cope with four years of the worst drought in the state's history. These restrictions, under which cities and towns in the state were told to cut water use by 25 percent, could be the first step in what many researchers and analysts say is a fundamental change in the way California uses it's diminishing water supplies. Recently, National Geographic and other media outlets have reported extensively on the drought in California and on emerging water scarcity across the western United States, and have shown how a warming climate and the lack of snow in the Cascades and Sierra Nev. Mountain ranges have dramatically reduced snowmelt, a crucial provider of water to California and the agricultural belt in its Central Valley. Calif., for the first time, passed legislation regulating groundwater use. Some of these restrictions have already taken effect, and more will be implemented in the coming years at both the state and local levels.

California has faced major droughts before, such as in the late 1970s. However, fewer than 20 million people lived in the state then, whereas nearly 40 million live in the state now. While Californians have drastically improved the efficiency of their water use in recent years, more must be done to bring the usage to sustainable levels. If rain and snow do not arrive in normal amounts, the supply of groundwater, much of which is nonrenewable, will continue to decline as it is used to make up for surface shortages.

Most homes do not have an easy and reliable way to measure water consumption. Typically, a homeowner will learn of his or her total consumption only when the amount is reported on a monthly water bill. Homeowners that are particularly dedicated to conservation can check their municipal water meters more frequently, but this is a manual process resulting in low-resolution data, and therefore does a poor job of showing how water usage changes based on activity throughout the day. Because homeowners typically do not have access to real-time water use data, they cannot easily know if and when appliances or faucets use disproportionate amounts of water. Additionally, long-running leaks tend to go unnoticed, resulting in large water bills and damage to structures. Real-time water meters, such as the present invention, can be a boon to residential water conservation by identifying leaks and other wasteful uses of water. This can save homeowners money off of their water bills, and it can prevent many thousands of dollars of damages from leaks. There are several consumer water meters currently either in the market or in development, but they all have critical flaws which the present invention lacks. The first type of meter is one that is installed directly inline near the primary water main, and uses either a positive displacement or multi-jet mechanism which will spin in proportion to the water's flow rate. These meters use proven and reliable technology, but they can only be installed by removing a section of pipe and are thus not suitable for installation without a professional plumber. Other schemes involve placing meters nearer the individual outlets in a home. These are more easily installed, but they quickly become expensive as the number of outlets increases, they can be difficult to maintain, and they cannot detect leaks that happen between the water main and the water outlets. Other meters can measure water flow without cutting a pipe via ultrasonic transit time analysis or acoustic analysis of the flow itself, but these tend to be very expensive, difficult to calibrate, or both. In contrast, the present invention is designed to be simple to install, to require little calibration, and to be affordable for homeowners.

Yet the prior art fails to optimally provide methods and systems to detect and/measure fluid flow and optionally provide leak detection.

There is therefore a long-felt need for methods and devices for detecting and/or measuring fluid flow, including but not limited to water flow, within channels of plumbing systems, and that preferably can be easily or manually installed into prior art plumbing systems.

SUMMARY AND OBJECTS OF THE INVENTION

Towards these and other objects of the method of the present invention (hereinafter, "the invented method") that are made obvious to one of ordinary skill in the art in light of the present disclosure, the present invention provides a system (hereinafter, "the invented system") for monitoring and optionally affecting fluid flow within an element of a plumbing structure, and a method of use thereof. The method of the present invention (hereinafter, "the invented method") enables monitoring and optionally means to affect water flow within an element of a plumbing structure.

A first preferred embodiment of the invented method provides an apparatus for measuring water usage in a residence, commercial property, or other building structure having a plumbing system that includes an accessible hose bib or other suitable valve located near the input to a water supply of selected plumbing system.

A first preferred embodiment of the invented system can be manually installed by a tap and screw fitting onto the hose bib. The invented system optionally employs a tethered drag block which is inserted into a plumbing system pipe. When water is flowing into and through the plumbing system, the water flow exerts a drag force on the drag block which will be transmitted from the drag block via the tether to a sensor module, where the water flow force can be converted to a digital or analog electrical signal. A stronger detected drag force indicates faster flowing water, and, with proper calibration, can be converted by the sensor module, a control module, or a remote wirelessly communicatively-coupled computational module into a measurement of the rate of water flow through the pipe.

An alternate preferred embodiment of the invented method provides a device optionally comprising one or more of the elements of (a.) a tensile force detector adapted to detect tensile force and emit an electrical signal upon tensile force detection; (b.) a drag block coupled with the tensile force detector, the drag block sized and shaped for insertion into a fluid piping while maintaining a clearance radius from an internal wall of the fluid piping; (c.) a strain sensor coupled with the drag block, the strain sensor emitting the electrical signal upon detection of tensile force; (d.) a signal pathway coupled with the strain sensor and providing a pathway of the electrical signal toward an exterior of the device; (e.) wireless communications means to transmit data from and optionally receive commands from an external wireless communications device; and (f.) means to deploy, and/or deform the drag block while the drag block is inserted into a plumbing system.

Still alternate preferred embodiments of the invented system comprise one or more of (a.) block sized and shaped for insertion into a fluid piping while maintaining a clearance radius from an internal wall of the fluid piping; (b.) a strain sensor coupled with the drag block, the strain sensor emitting an electrical signal derived from a magnitude of tensile force received from the drag block; (c.) a tether disposed between the drag block and the strain sensor, the tether coupled at a first tether end with the strain sensor and at a second tether end to the drag block, and the tether transferring the magnitude of tensile force from the drag block and to the strain sensor; (d.) a strain to flow converter, the strain to flow converter communicatively coupled with the strain sensor and deriving a measurement datum from the electrical signal received from the strain sensor; and/or (e.) a controller, the controller communicatively coupled with both the drag block and the strain to flow converter, and the controller adapted to a provide control signals to affect the drag block.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
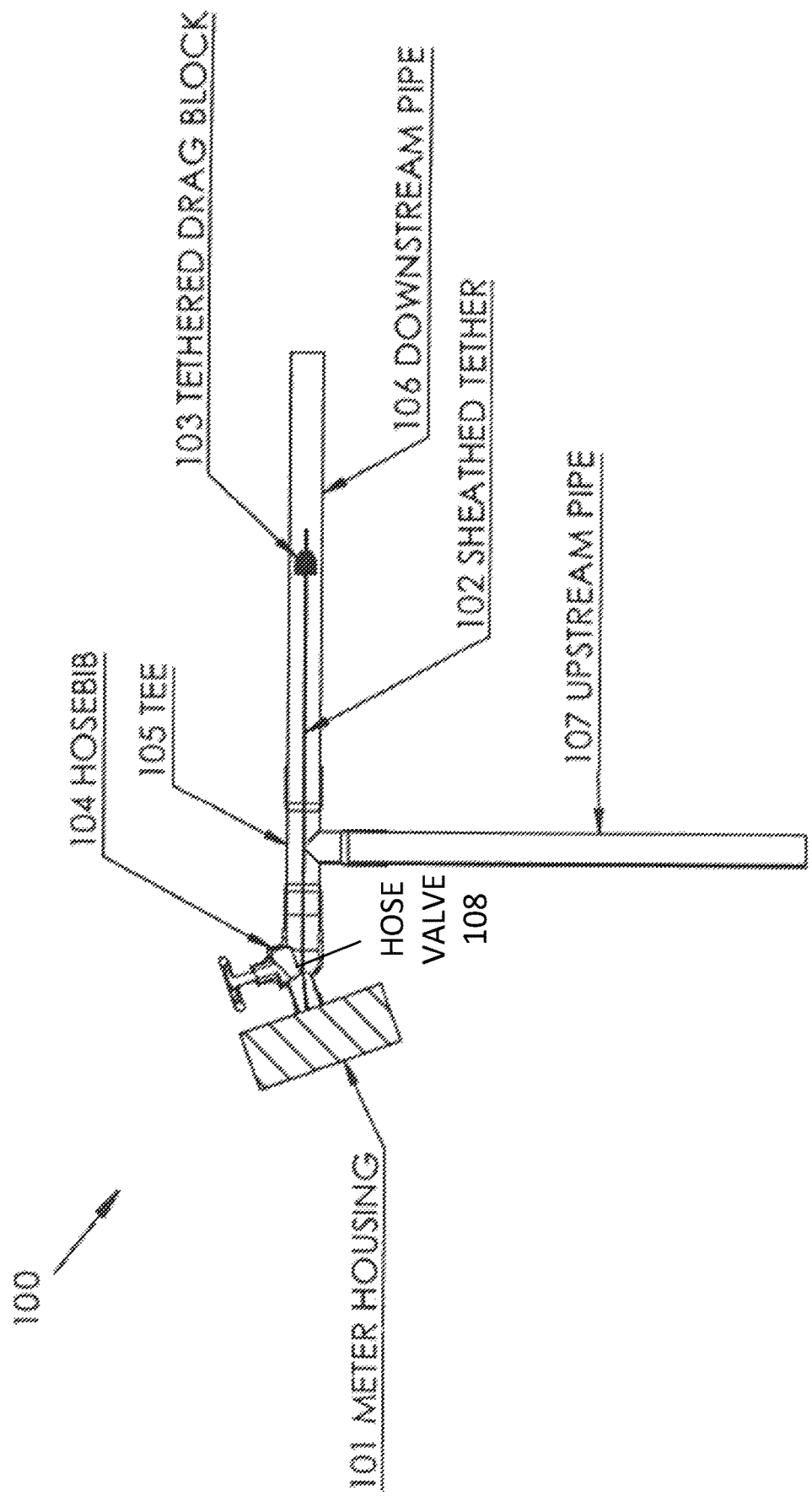
FIG. 1 is a representation of a meter installed at a hose bib attachment point.

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

A first preferred embodiment of the present invention 100 (hereinafter, "the first system" 100 is a tethered drag flow meter, the function of which is to measure water flow in a residential household or any other plumbing system which has an accessible hose bib 104. The first system 100 is designed to be easily installed and fitted to the hose bib 104, with minimal expertise or tool use. The principle components of the first system 100 described here are the attachment mechanism, a meter housing 101, a sheathed tether 102, a drag block 103 coupled with the sheathed tether 102, a strain sensor 304, and a calibration unit. It is understood that the tether and the drag block generate fluid drag when installed in a plumbing channel (not shown). Further optional components of the first system 100 not detailed here will typically be required to make use of the data provided by the sensor, such as, for example, data storage mechanisms, data processing, digital or analog displays, and wireless transmission of the flow rate data. The hose bib 104 preferably complies with the American Society of Mechanical Engineers hose bib structure and design standards as expressed in the ASME document number A112.18.1/CSA B125.1 and titled "Plumbing Supply Fittings", the ASME document number A112.19.1/CSA B45.2 and titled "Enameled Cast Iron and Enameled Steel Plumbing Fixtures", and/or the ASME document number A112.19.2/CSA B45.1 titled, "Ceramic Plumbing Fixtures".

Referring now generally to the Figures and particularly to FIG. 1, FIG. 1 shows a diagram of the invention installed on the typical residential hose bib 104. In this diagram, the visible components of the first system 100 include the meter housing 101, the sheathed tether 102, and the drag block 103. In one embodiment of the first system 100 the meter housing 101 is screwed directly onto an existing hose bib 104, which is typically connected to a residential water supply via a tee unit 105. A hose valve 108 of the tee unit 105 is preferably set to the open position to enable the drag block 103 to be inserted through the hose valve 108 and into a downstream pipe 106. An upstream pipe 107 optionally supplies water to a residence or other building. The tee unit 105, hose valve 108, downstream pipe 106 and the upstream pipe 107 preferably each comply with the American Society of Mechanical Engineers equipment structure and design standards as expressed in the ASME document number A112.18.1/CSA B125.1 and titled "Plumbing Supply Fittings", the ASME document number A112.19.1/CSA B45.2 and titled "Enameled Cast Iron and Enameled Steel Plumbing Fixtures", and/or the ASME document number A112.19.2/CSA B45.1 titled "Ceramic Plumbing Fixtures".

In order to install the first system 100, in one embodiment, the water supply must be shut off in the upstream pipe 107 and water must be drained out of the downstream pipe 106. Then, the hose valve 108 can be opened and the drag block 103 and sheathed tether 102 can be inserted through the hose bib 104 and into the downstream pipe 106. Once the meter housing 101 has been securely attached onto the hose bib 104, the water supply can be turned back on. In certain alternate preferred embodiments of the first system 100, no tools are necessary to install the first system 100. However, depending on the selected plumbing system's water pressure and the quality of the hose bib, plumbing tape or other sealants may be required to prevent drips from forming around the meter housing attachment point.

Figure 2:
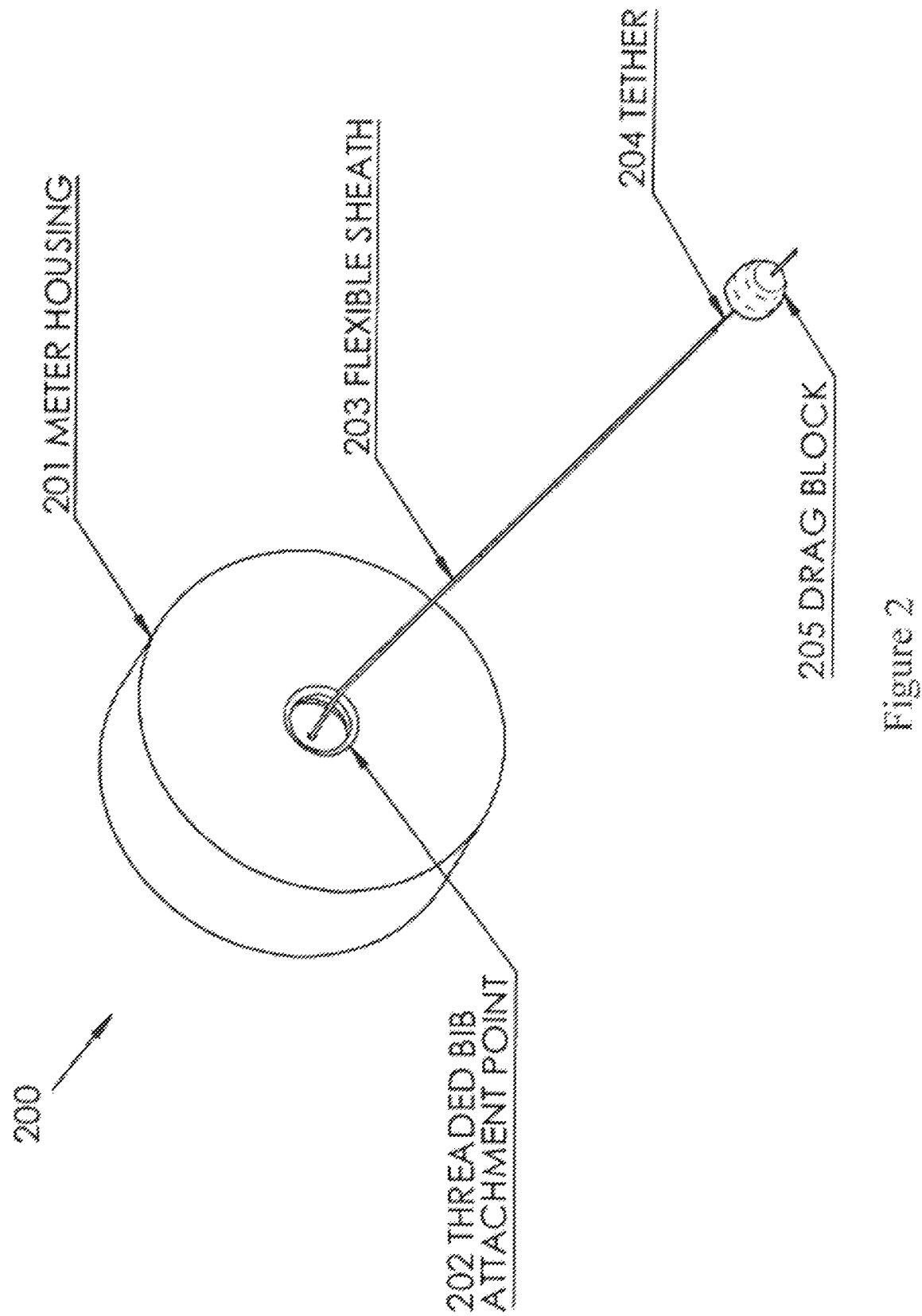
FIG. 2 is a representation of a meter, detailing its external components.

Referring now generally to the Figures and particularly to FIG. 2, FIG. 2 details the external components of an alternate preferred embodiment 200 of the invented system 100, wherein an alternate second meter housing 201 (hereinafter, "the housing) 201) is designed to be easily gripped such that the meter housing 20 can be screwed onto the hose bib 104 via a threaded bib attachment point 202 using only manual force. The housing 201 includes a hose side plate 201A that inhibits water from flowing into the housing 201 and an exterior side 201B that is distal form the hose bib when 104 when the first system 100 is operationally attached to the hose bib 104.

An alternate second flexible sheath 203 extends out of the meter housing from the center of the attachment point. The second sheath 203 must be flexible enough to accommodate bends in the plumbing system—especially those in the hose bib 104—but sturdy enough such that the second sheath 203 can be manually pushed without collapsing. The second sheath 203 contains an alternate second tether 204 which connects an alternate second drag block 205 to the second meter housing 201. The second sheath 203 functions to eliminate friction between the second tether 204 and the surrounding pipe, to ease installation by enabling the second drag block 205 to be manually pushed up the pipe, and to protect the second tether 204 from being pinched by a user accidentally closing the hose valve 108 when the second tether 204 is already in place in a channel of a plumbing system.

Figure 3:
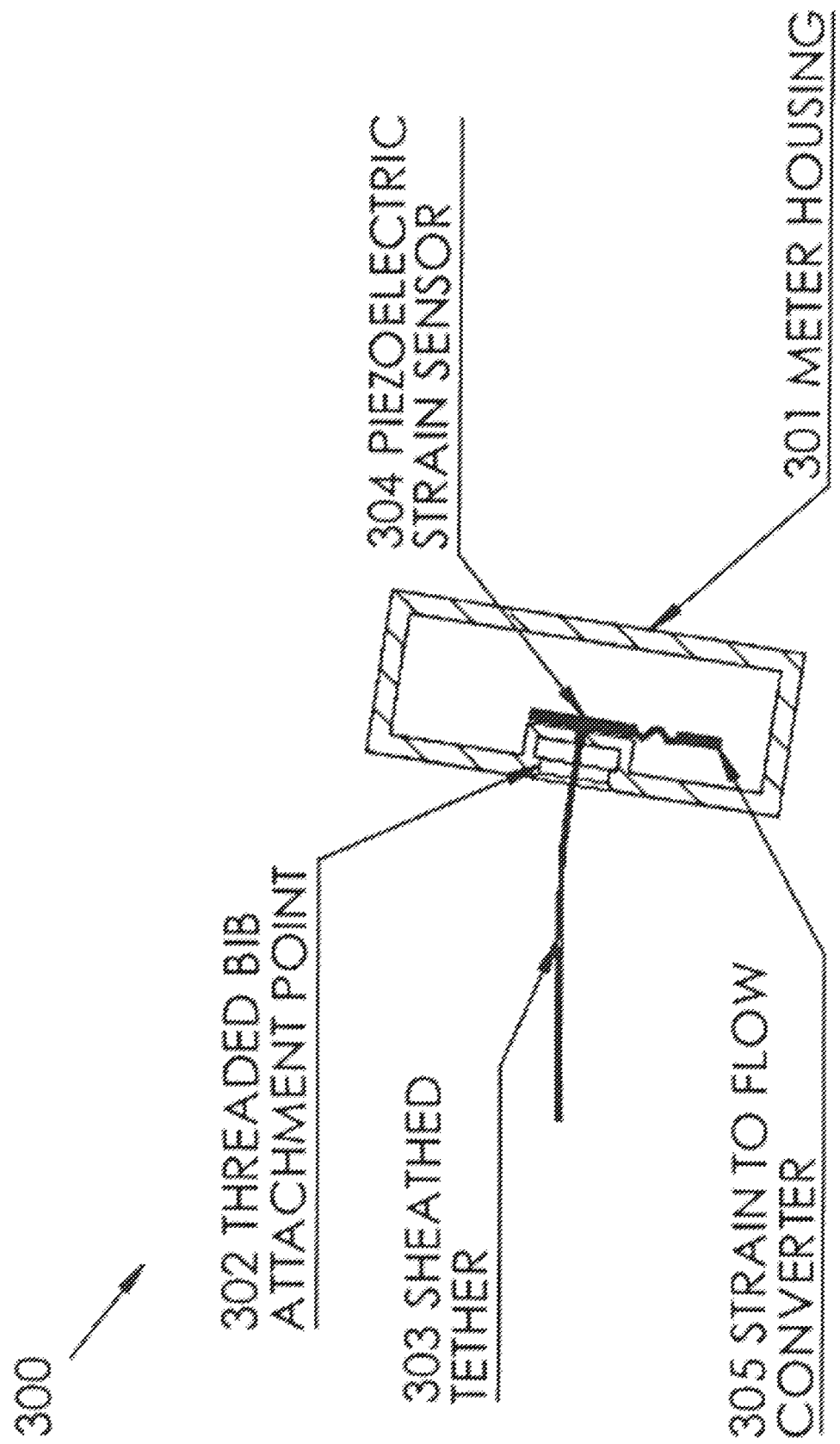
FIG. 3 is a cross-sectional representation of a meter housing and internal components.

Referring now generally to the Figures and particularly to FIG. 3, FIG. 3 shows a cross-sectional schematic of a third meter housing 301 of an additional alternate preferred embodiment 300 of the first system 100. The third meter housing 301 is designed and adapted to be dry in the course of normal operation of the additional alternate preferred embodiment 300 of the first system 100. The third meter housing 301 has an alternate threaded hose bib attachment point 302, out of which extends a third flexible sheathed tether 303. Next to the third attachment point 302 and immediately inside of the third meter housing 301 there is a rubber seal (not shown) which prevents water from flowing from the third sheathed tether 304 into the third meter housing 301. The third sheathed tether 303 extends through the rubber seal and connects to a strain sensor 304, which may optionally be or comprise a piezoelectric element. When water flows across a drag block 103 & 205 coupled to the strain sensor 304, the water force will exert a drag force onto the instant coupled drag block 103 & 205 in the direction of the flow of the water. This drag force will be transmitted by the sheathed tether 303 to the strain sensor 304, whereupon the strain sensor 304 translates a received magnitude of force to an electric signal. This electrical signal is then communicated to a strain-to-flow converter 305. The strain-to-flow converter 305 when properly calibrated will perform the nonlinear conversion from the strain signal to a flow rate output as a digital signal.

The strain-to-flow converter 305 can either be or comprise an individual component and/or be coupled with other electronics and signal processors (not shown) that could, for example, store, display, or wirelessly transmit the flow rate data. These additional optional electronics of yet additional alternate preferred embodiments of the first system 100 will require a power source, also not shown.

Figure 4:
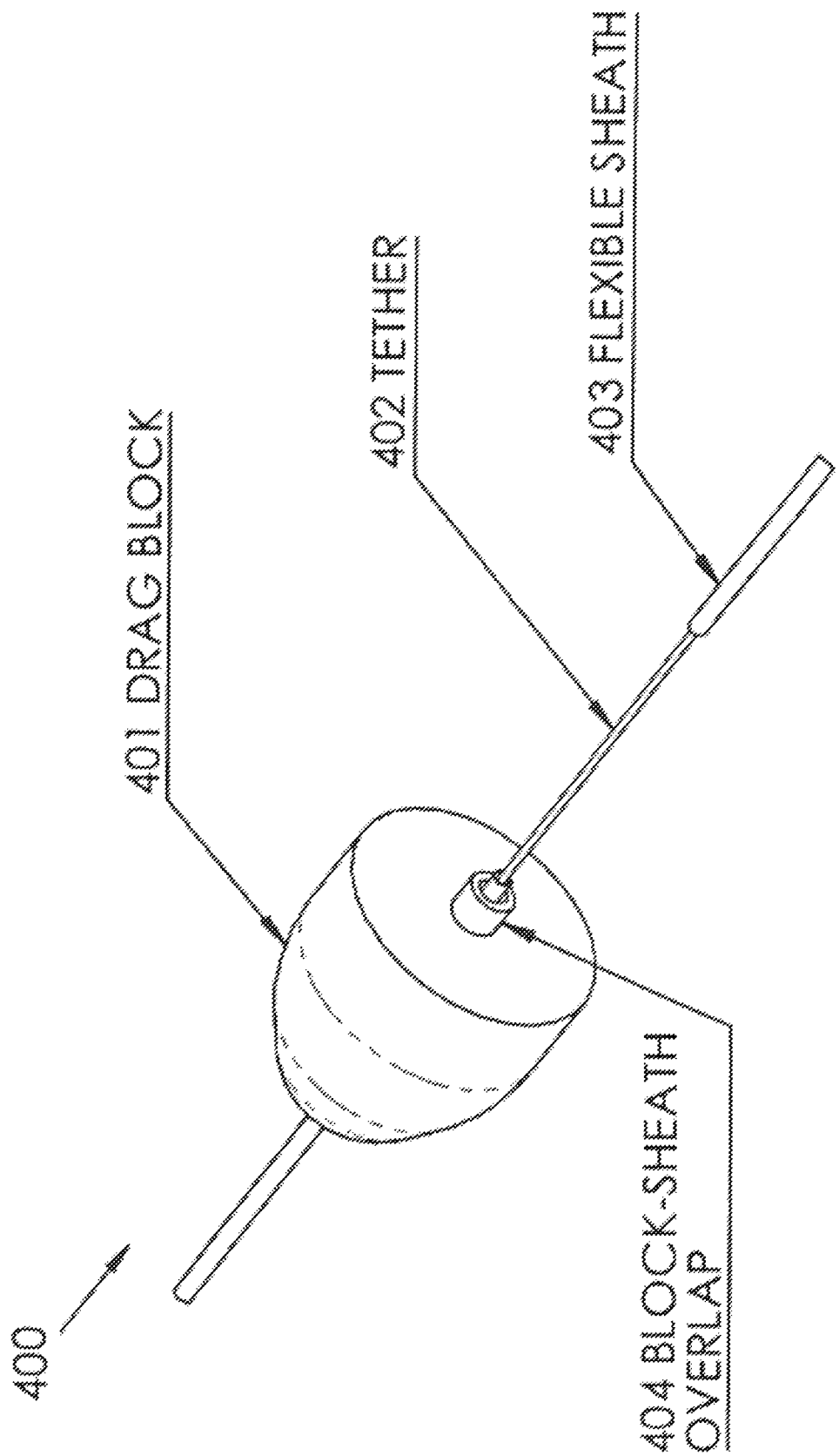
FIG. 4 is a detailed view of a representation of a tethered drag block, which, after installation, resides inside a pipe.

Referring now generally to the Figures and particularly to FIG. 4, FIG. 4 presents a yet additional alternate preferred embodiment 400 of the first system 100 and shows how a fourth drag block 401 is interfaced with a fourth tether 402 and a fourth sheath 403. In order for the fourth drag block 401 to be inserted into a pipe or other plumbing channel, it is helpful for it to be fitted onto a tip of the fourth tether 402. Otherwise, the fourth drag block 401 would bend backwards during installation and would not be correctly aligned with flowing water though a comprising plumbing channel, e.g., a pipe. To this end, the fourth drag block 401 can have a recessed area or a lip that is slightly wider than a fourth flexible sheath 403. The fourth tether 402 can be attached to the center of this recessed area, and the entire fourth drag block 401 can sit securely at the tip of the fourth tether 402 during installation. It has a pointed or arrow-like shape to enable pushing of the through fourth tether 402 the pipes and other fluid channels. The fourth drag block 401 is designed to minimize turbulence while maximizing drag, and to have minimal negative effect upon the a comprising environment's fluid flow rate.

Figure 5:
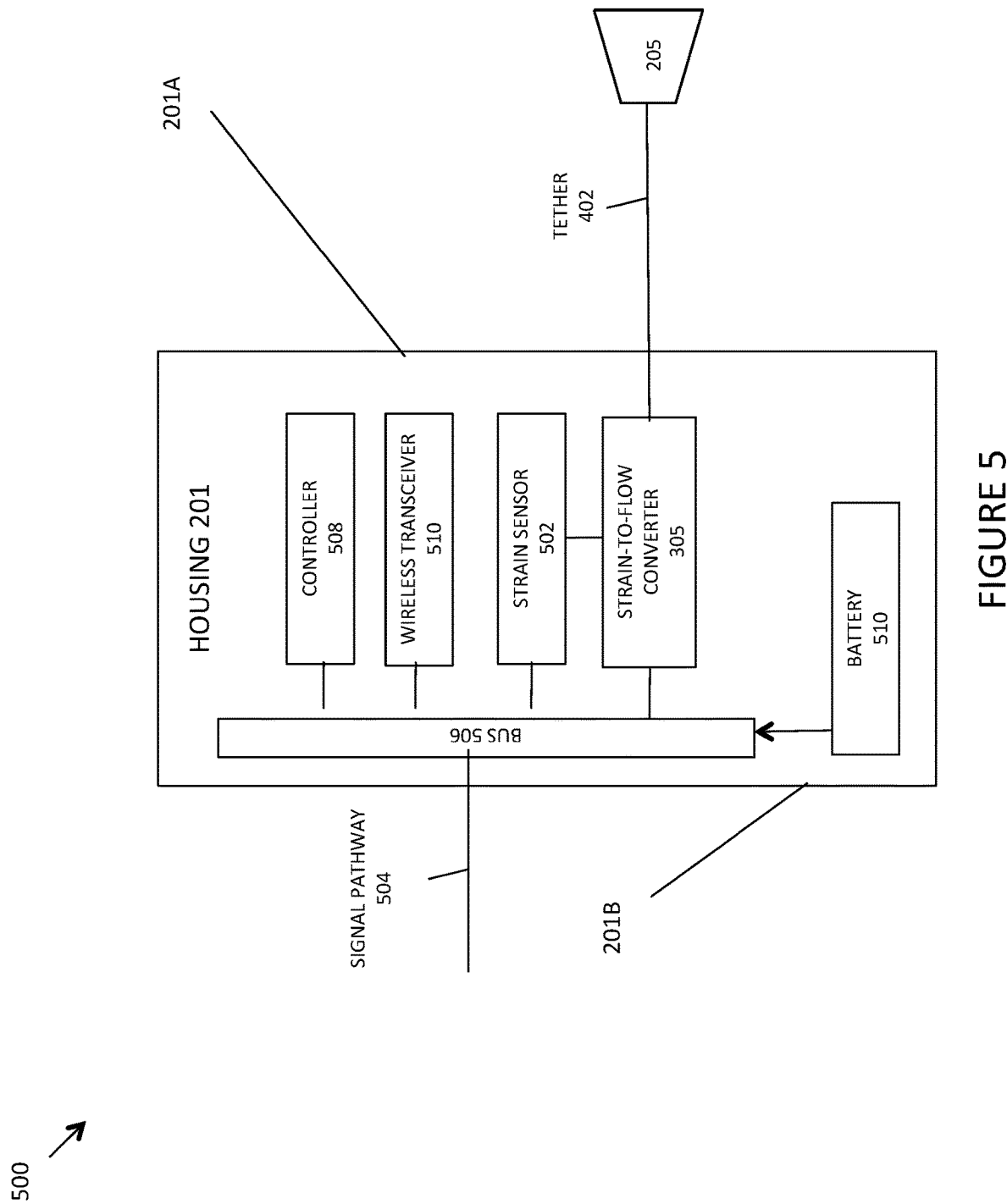
FIG. 5 is a block diagram of a second alternate preferred embodiment of the invented system (hereinafter, "the second system") including a signal pathway extending from the strain sensor to an exterior.

Referring now generally to Figures and particularly to FIG. 5, FIG. 5 is a block diagram of a second alternate preferred embodiment of the invented system 500 (hereinafter, "the second system" 500) including a signal pathway 504 extending from the strain sensor to an exterior of the second housing 201. The second system further includes an alternate strain sensor 502 that is communicatively coupled to the strain-to-flow converter 305 and a signal pathway 504. The fourth tether 402 is operatively coupled to both the strain-to-flow converter 305 and the second drag block 205 and transfers tensile force from second drag block 205 to the strain-to-flow converter 305.

A power and communications bus 506 communicatively couples the signal pathway 504, a controller 508, a wireless communications transceiver 510, and the strain sensor 502. In addition, the power and communications bus 506 further accepts electrical energy from a battery 512 and transfers the received electrical energy to the controller 508, the wireless communications transceiver 510, the strain sensor 502 and the strain-to-flow converter 305. The controller 508 may be or comprise a suitable programmable electronic controller, microcontroller, processor and/or microprocessor known in the art, such as but not limited to an MST (™) microcontroller as marketed by Texas Instruments, Inc. of Dallas, Tex. The wireless energy mode is preferably adapted to perform in accordance with one or more wireless communications standards selected from the standard group consisting of a cellular telephone SMS standard, a WiFi standard, and a Bluetooth standard. The second housing 201 is adapted to seal and maintain the controller 508, the wireless communications transceiver 510, the strain sensor 502, and the battery 512 in a dry condition.

Figure 6:
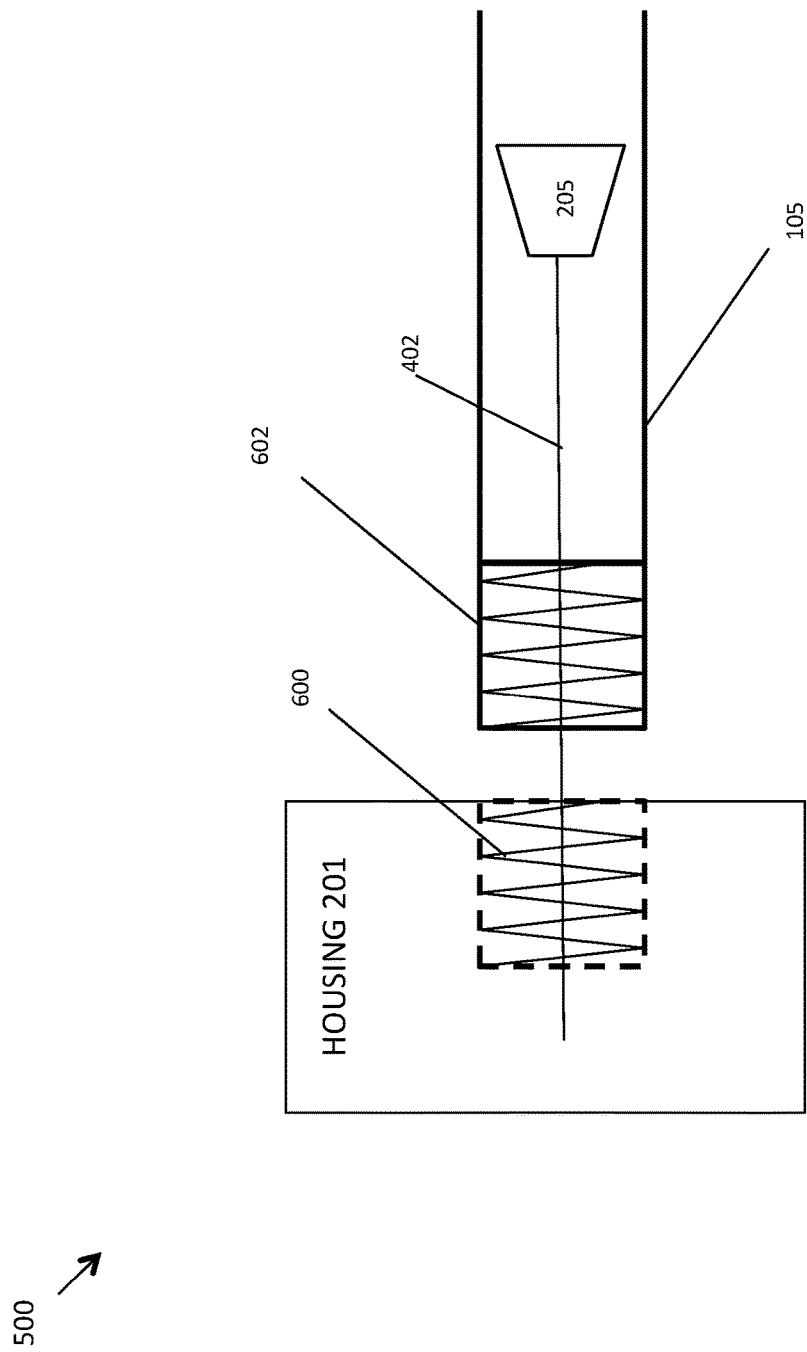
FIG. 6 is a block diagram of an attachment feature of the second system of FIG. 6.

Referring now generally to the Figures and particularly to FIG. 6, FIG. 6 is a block diagram of an attachment feature 600 of the second system 500. The attachment feature 600 is a tapped portion of the second housing 201 that removably receives, engages and couples with an exterior threaded portion 602 of the tee pipe 105.

Figure 7:
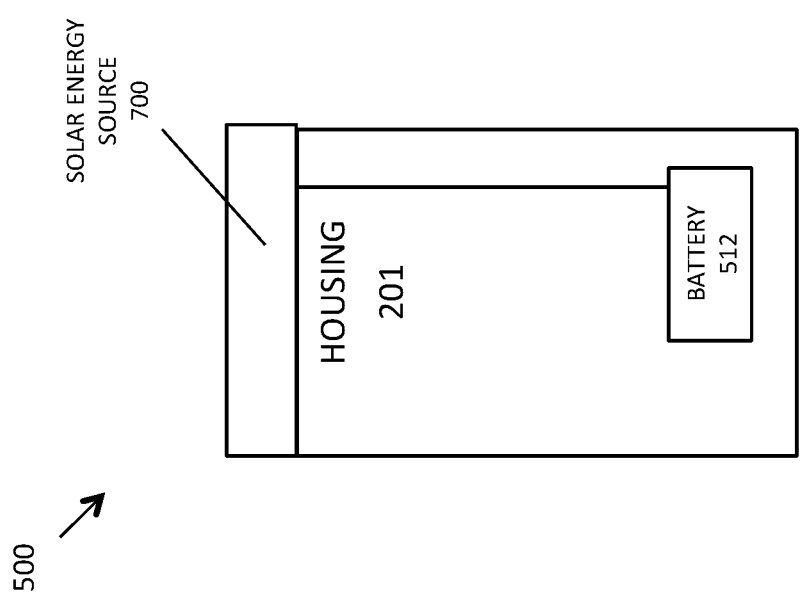
FIG. 7 is a block diagram of an additional optional solar energy source coupled to the battery of the second system.

Referring now generally to the Figures and particularly to FIG. 7, FIG. 7 is a block diagram of an additional optional solar energy source 700 coupled to the battery 512 of the second system 500.

Figure 8:
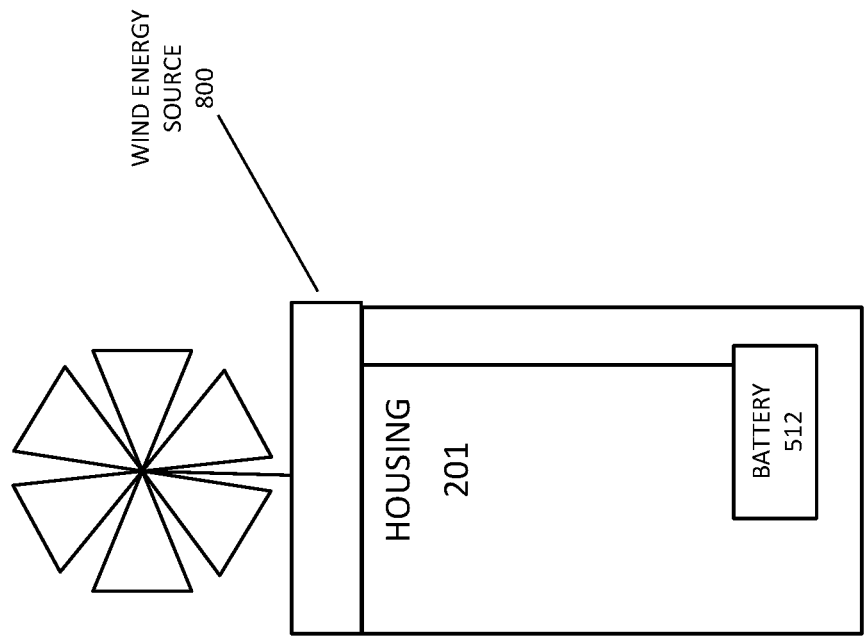
FIG. 8 is a block diagram of a wind energy source coupled to a battery of the second system of FIG. 5.

Referring now generally to the Figures and particularly to FIG. 8, FIG. 8 is a block diagram of a wind energy source 800 coupled to a battery of the second system 500.

Figure 9:
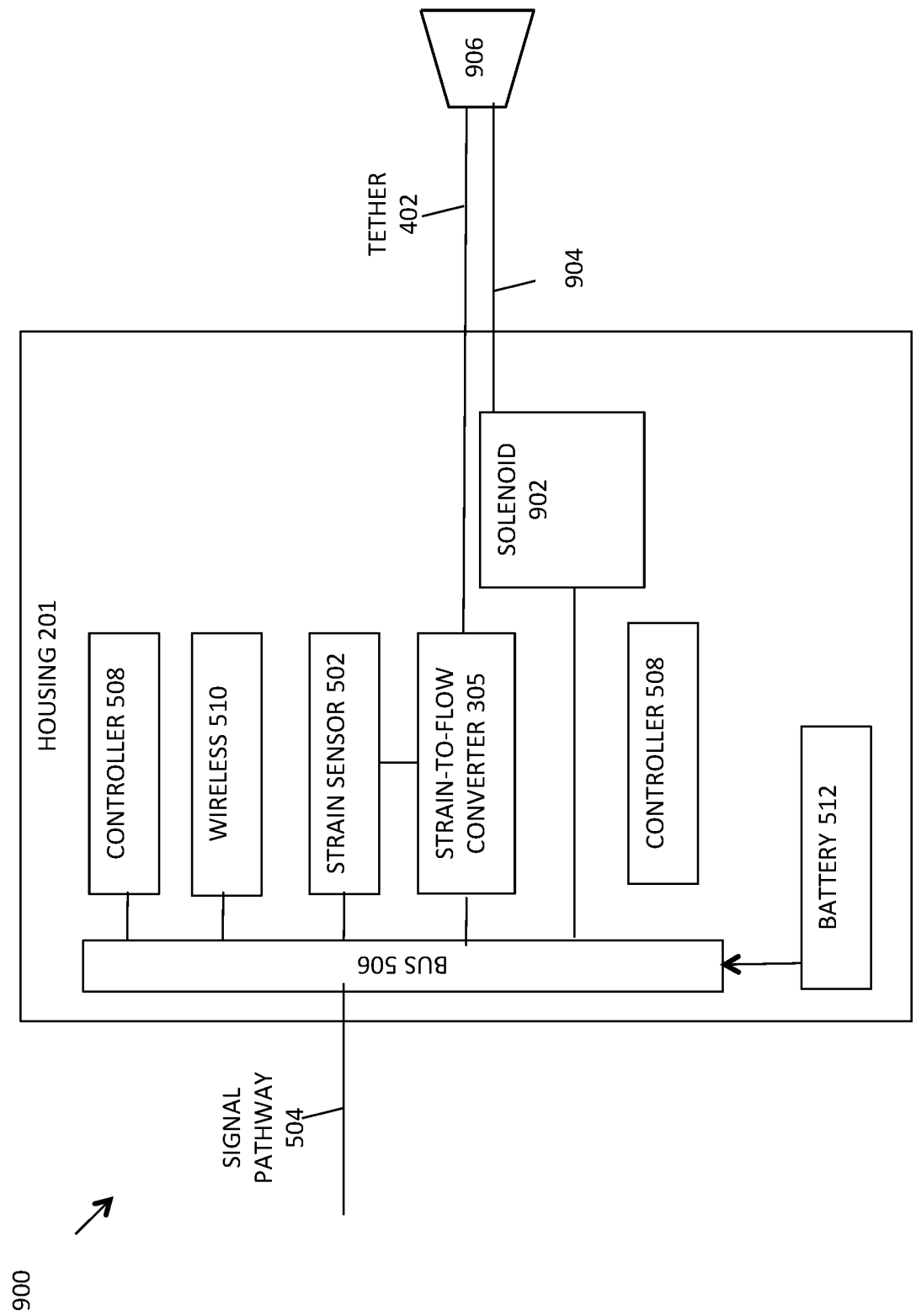
FIG. 9 is a block diagram of a third invented system having the elements of the second system of FIG. 5 and further including a solenoid coupled with an additional arm coupled with an alternate deployable spring-energized drag block in an insertion state.

Referring now generally to the Figures and particularly to FIG. 9, FIG. 9 is a block diagram of a third invented system 900 (hereinafter, "the third system" 900) having the elements 201 and 502 through 512 of the second system of FIG. 5 and further including a solenoid 902 coupled with an additional arm 904 coupled with an alternate deployable spring-energized drag block 906 presented in an insertion state. The solenoid 902 is communicatively coupled with the communications bus 506 and receives electrical power from the communications bus 506 as directed by the controller 508. When the solenoid 902 receives sufficient electrical energy via the communications bus 506, the solenoid applies magnetic energy to the magnetically interactive arm 904 to cause the arm 904 to move toward the spring-energized alternate deployable drag block 906 and away from the solenoid 902 and to thereby enable the alternate deployable drag block 906 to transition from a deployed state and into an insertion state.

Figure 10A:
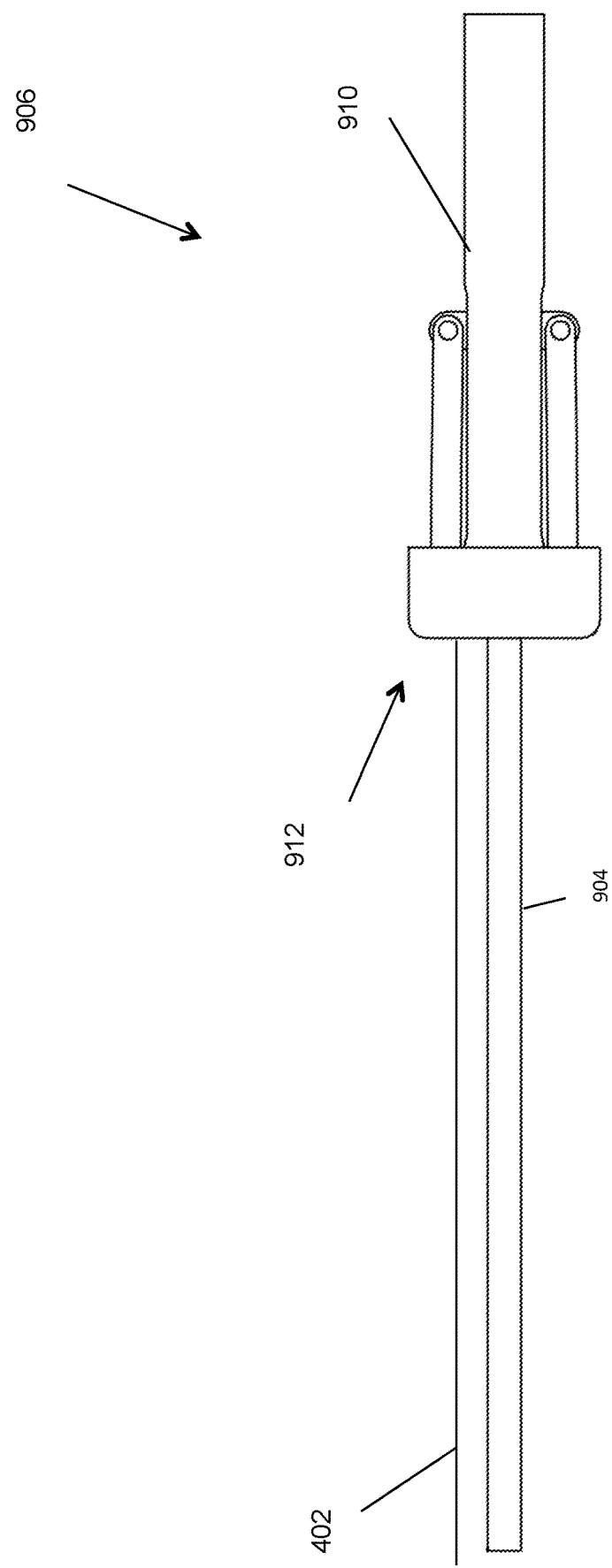
FIG. 10A is a detailed top view of the alternate deployable drag block of FIG. 9 in the insertion state.
Figure 10B:
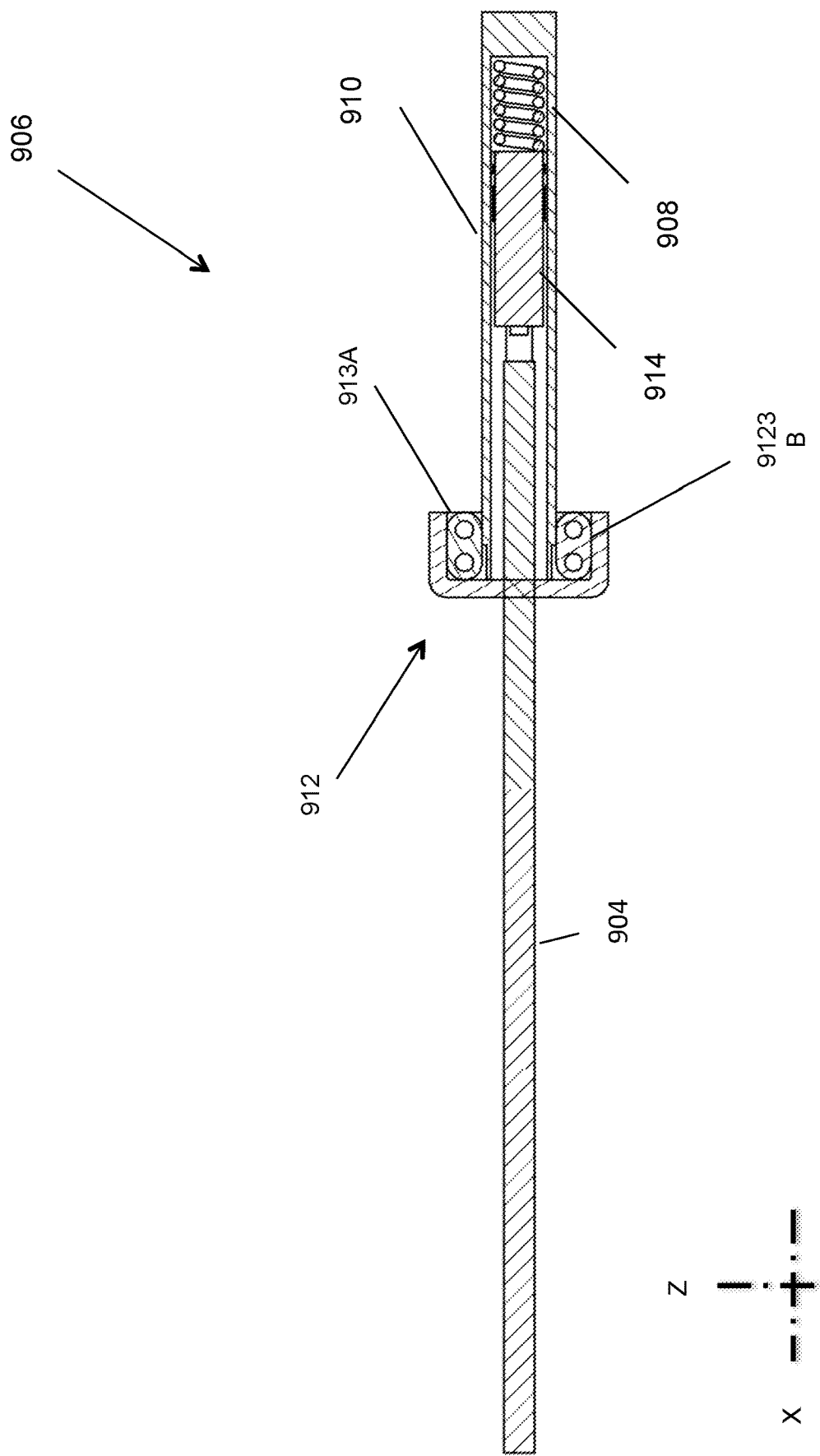
FIG. 10B is a detailed cut-away side view of the alternate deployable drag block of FIG. 9 in the insertion state.

Referring now generally to the Figures and particularly to FIG. 10A and FIG. 10B, FIG. 10A is a detailed top view of the alternate deployable drag block 906 presented in the insertion state. The arm 904 applies pressure toward a drag block spring 908 (as shown in FIG. 10B) contained with a block housing 910; the force driving the arm 904 toward the drag block spring 908 is received from the energized solenoid 902. When the spring 908 is compressed by force transferred from the arm 904, a linkage assemble 912 of the drag block 906 conforms into an insertion state that presents a diminished extension along a Y-axis. The linkage assembly 912 includes a pair of first links 913A & 913B that are each separately rotatably coupled with the drag block housing 910.

Figure 11A:
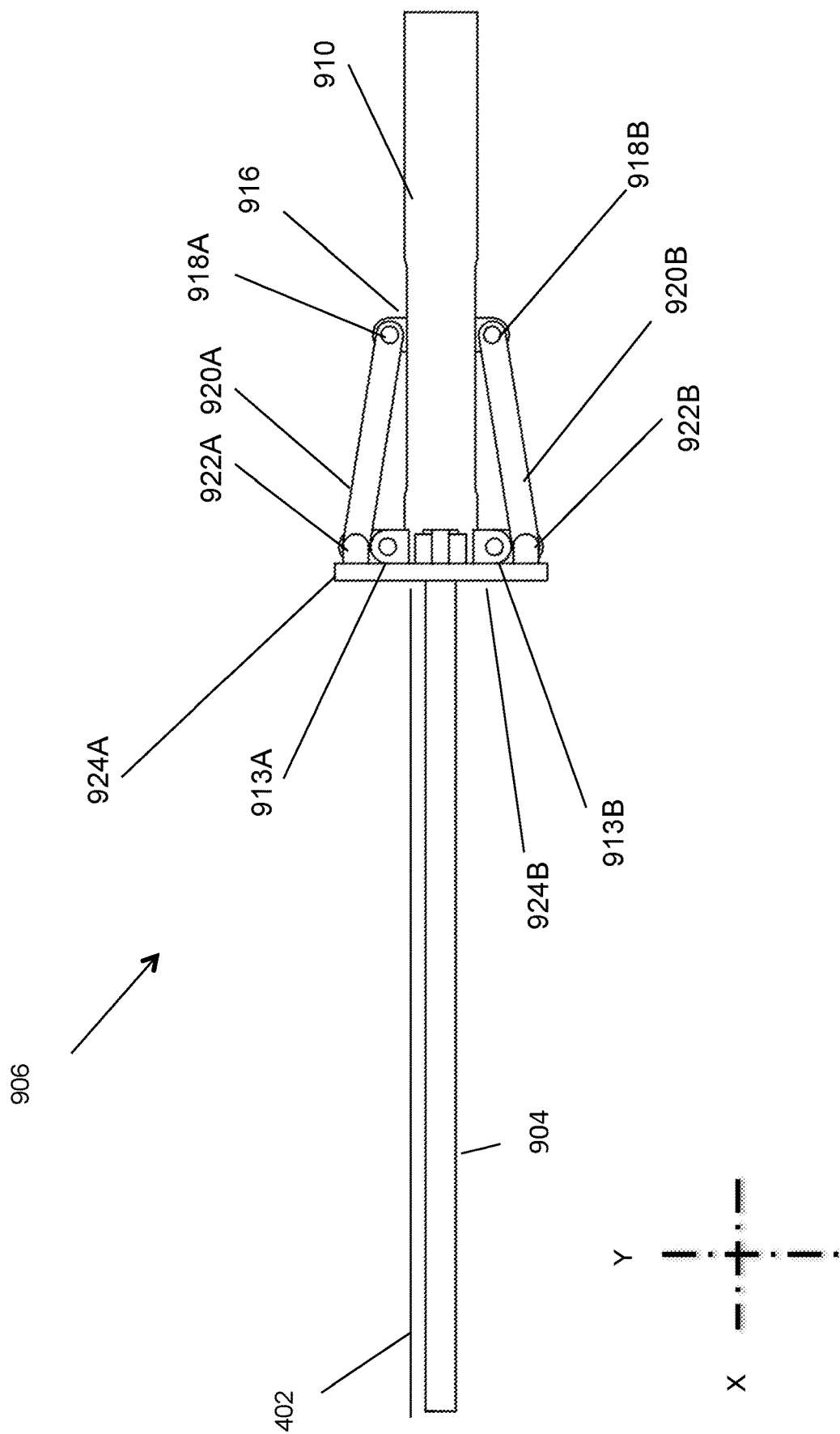
FIG. 11A is a detailed top view of the alternate deployable drag block of FIG. 9 in a deployed sate.
Figure 11B:
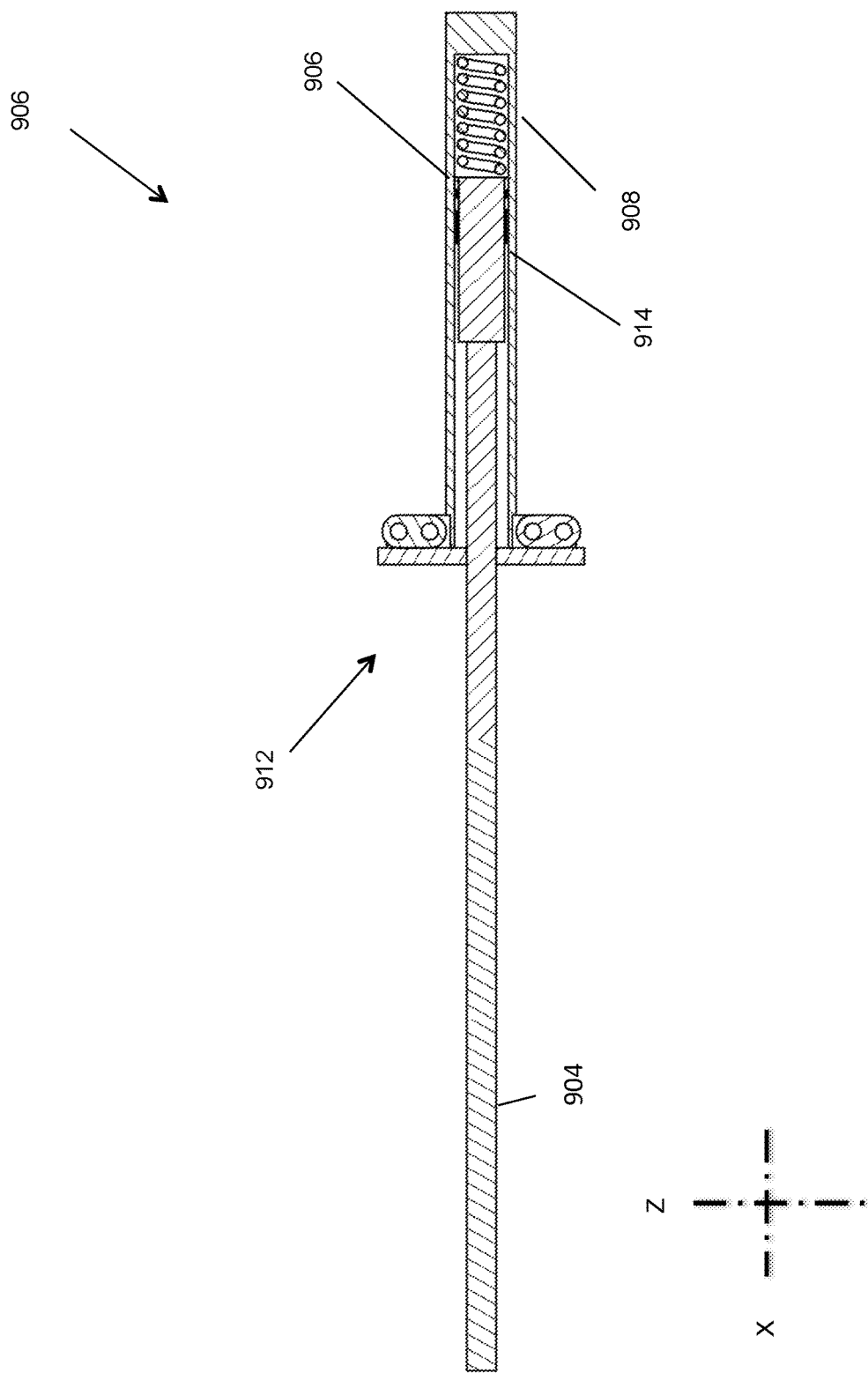
FIG. 11B is a detailed cut-away side view of the alternate deployable drag block of FIG. 9 in the insertion state.

FIG. 11A illustrates that the drag block linkage assembly 912 includes a first bar 916 that is coupled to the drag block inner arm 914 whereby the drag block inner arm 914, when not restrained by the arm 904, transfers compressive force from the drag block spring 908 to the linkage assembly 912 and thereby aligns the drag block linkage assembly into the deployed state of FIG. 11A and FIG. 11B.

The first bar 916 is rotatably and separately attached to each of two connectors 918A & 918B. A first connector 918A is additionally rotatably coupled with a first intermediate link 920A, The second intermediate link 920B is additionally rotatably coupled with a third connecter 922A of a first wing plate 924A. Force sourced from the spring 908 and applied to the first wing plate 924A and delivered via the linkage assembly 912 chives the first wing plate 924A into to alignment into the deployed state as presented in FIG. 11A.

A second connector 918B is additionally rotatably coupled with a second intermediate link 920B. The first intermediate link 920B is additionally rotatably coupled with a fourth connecter 922B of a second wing plate 924B. Force sourced from the spring 908 and applied to the second wing plate 924B and delivered via the linkage assembly 912 drives the second wing plate 924B into to alignment into the deployed state as presented in FIG. 11A.

It is understood that the pathway of force sourced from the spring 908 when deployable drag block 906 is in the insertion position of FIG. 10A includes and extends through the drag block inner arm 914, the first bar 916, the two first connectors 918A & 918B, the two first intermediate links 920A & 920B, additional third and fourth connectors 922A & 922B, the pair of wing plates 924A & 924B, the pair of first links 913A & 913B and the housing 910.

Referring now generally to the Figures and particularly to FIG. 10B, FIG. 10B is a detailed cut-away side view of the alternate deployable drag block 906 in the insertion state, wherein the arm 904 is pressed against a drag block inner arm 914 that in turn presses against the spring 908 to cause the drag block 906 to present the insertion state.

Referring now generally to the Figures and particularly to FIG. 11A, FIG. 11A is a detailed top view of the alternate deployable drag block 906 in a deployed sate, wherein the spring 908 is forcing the linkage assemble 912 of the drag block 906 to align into a deployed state that presents an increased extension along the Y-axis.

Referring now generally to the Figures and particularly to FIG. 11B, FIG. 11B is a detailed cut-away side view of the alternate deployable drag block 906 in the insertion state, wherein the spring 908 is forcing the drag block inner arm 914 to drive the linkage assembly of the drag block 906 to align into the deployed state that presents an increased extension along the Y-axis.

Figure 12A:
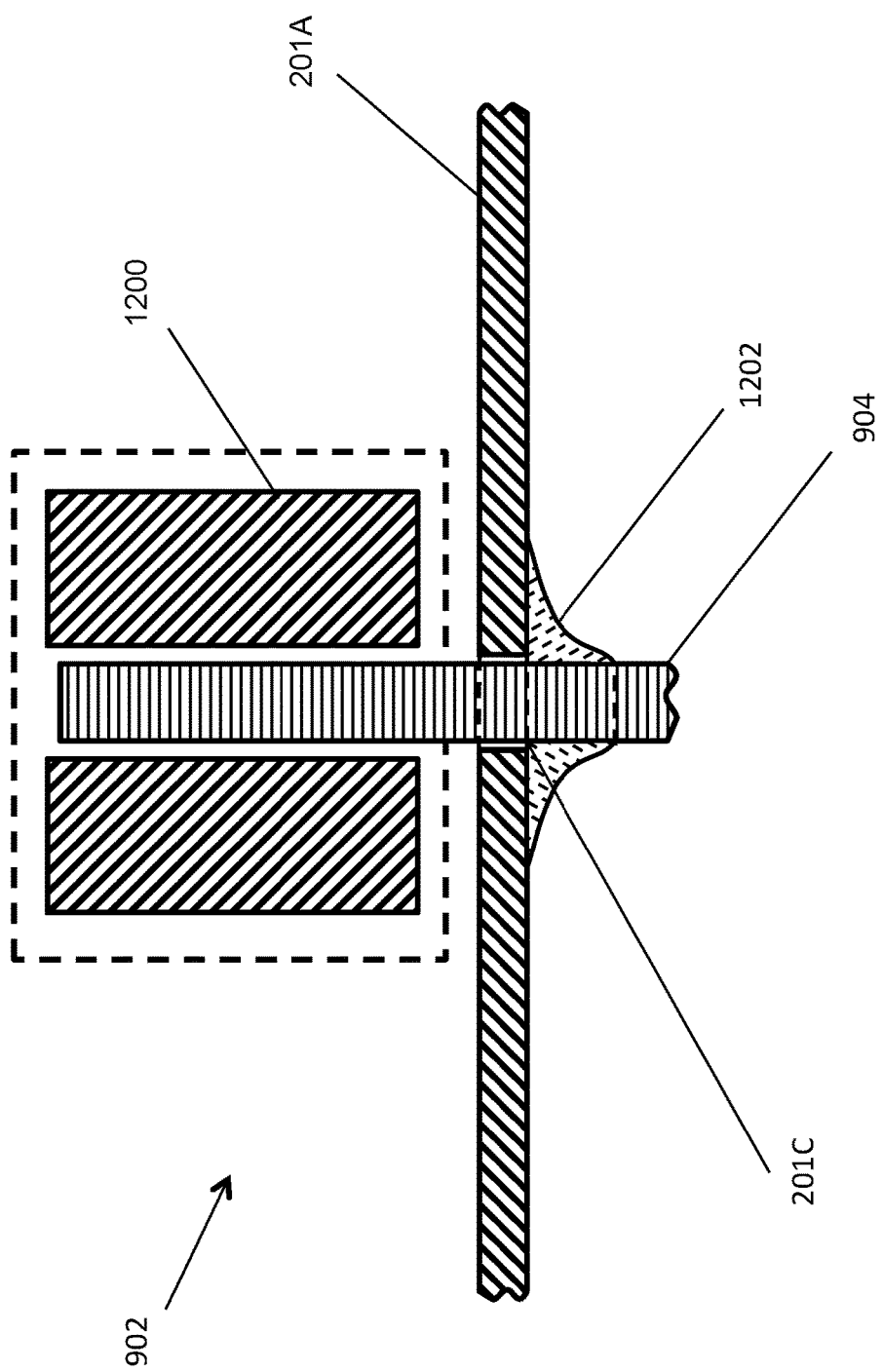
FIG. 12A is a block diagram of the solenoid of FIG. 9 in a disengaged state.

Referring now generally to the Figures and particularly to FIG. 12A, FIG. 12A is a block diagram of the solenoid 902 in disengaged state, wherein a coil 1200 of the solenoid 902 is not energized and the arm 904 is not receiving magnetic repulsing energy from the coil 1200. The arm 904 extends through a hose side aperture 201C of the hose side plate 201A of the housing 201. A flexible arm seal 1202 is attached to both the housing 201 and the arm 904 and encircles the water side aperture 201C and the arm 904; the arm seal 1202 prevents water from entering the housing 201 while enabling the arm 904 to transition to and from the insertion state and the deployed state.

Figure 12B:
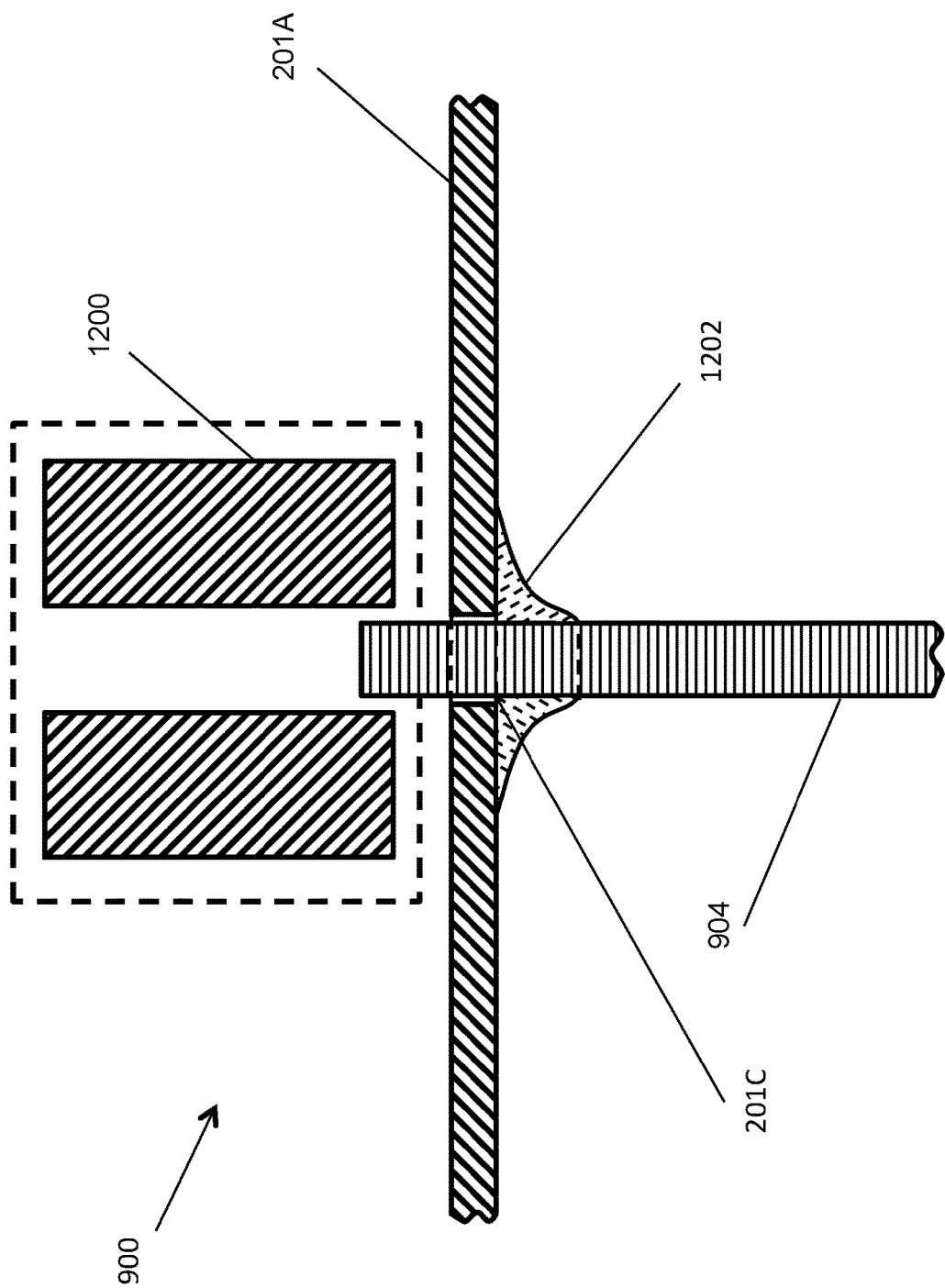
FIG. 12B is a block diagram of the solenoid of FIG. 9 energized to generate magnetic energy that repulses and pushes the additional arm of FIG. 9 toward the spring of the deployable drag block.

Referring now generally to the Figures and particularly to FIG. 12B, FIG. 12B is a block diagram of the solenoid 902 being energized and driving the additional arm 904 toward the spring 908 of the deployable drag block 906.

Figure 13:
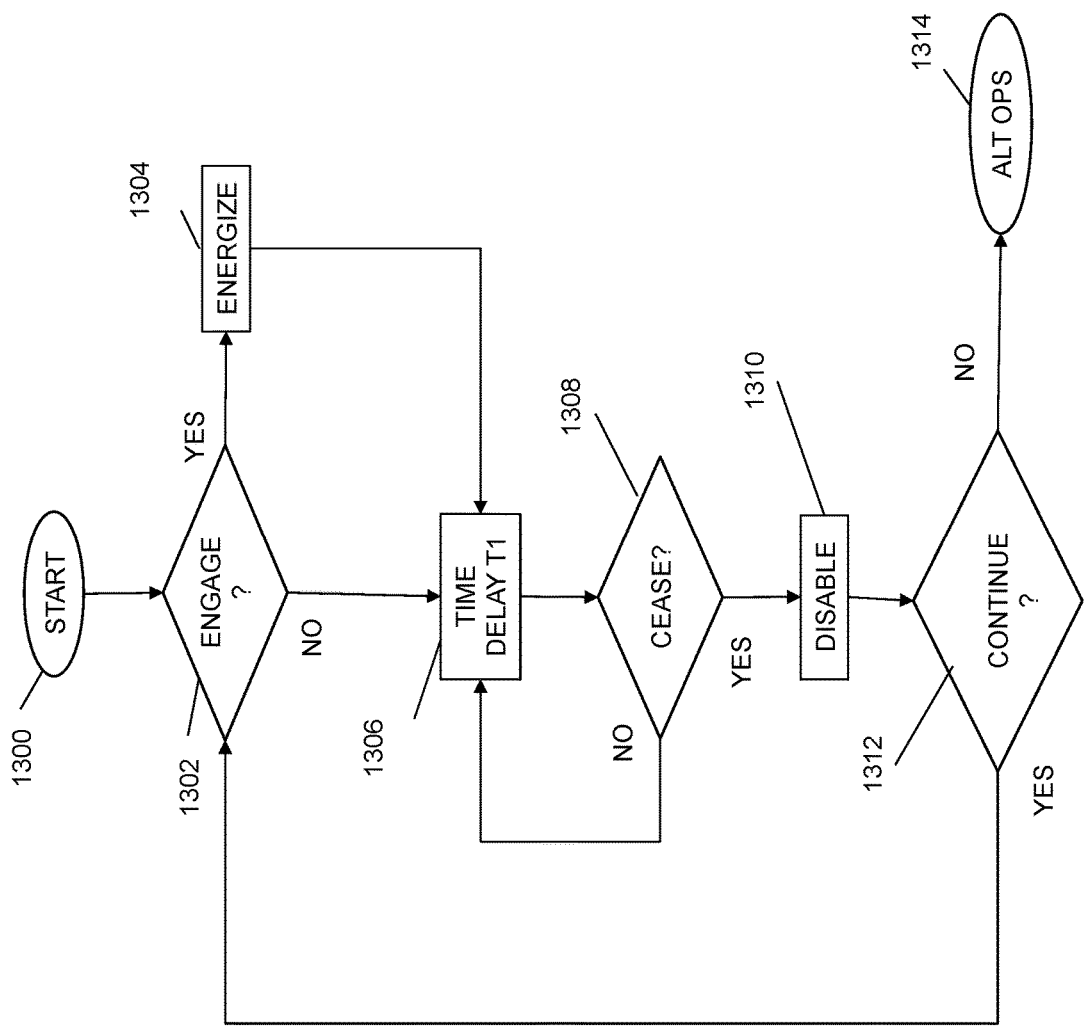
FIG. 13 is a flow chart of the third invented system of FIG. 9 alternately engaging and disengaging the solenoid of FIG. 9 with the arm of FIG. 9.

Referring now generally to the Figures and particularly to FIG. 13, FIG. 13 is a flow chart of the third invented system of FIG. 9 alternately engaging and disengaging the solenoid of FIG. 9 with the arm of FIG. 9. In step 1300 the third system 900 powers up and enables the controller 508 to provide power to the solenoid 902. In step 1304 the controller 508 determines to engage the arm 904 to cause the deployable drag block 906 to assume the insertion state of FIG. 10A. When the controller 508 in step 1304 the controller 508 determines to engage the arm 904 to cause the deployable drag block 906 to assume the insertion state, the controller 508 directs the communications bus 506 to energize the coil 1200 and to thereby generate a repulsive magnetic force that causes the arm 904 to press toward and transfer compressive force to the drag block spring 908.

The controller 508 proceeds from step 1302 or 1304 to step 1306 and counts down a first time delay value T1 by application of a real time clock (not shown) of the controller 508. After the controller 508 has determined in step 1306 that the first time delay value T1 has achieved a completion value, the controller 508 proceeds from step 1306 to step 1308 and to determine whether to cease maintaining the coil 1202 in an energized state or to continue maintaining the coil 1202 in an energized state. When the controller 508 determines in step 1308 to continue maintaining the coil 1202 in an energized state, the controller 508 proceeds back to an additional execution of step 1306. In the alternative, when the controller 508 determines in step 1308 to cease maintaining the coil 1202 in an energized state, the controller 508 proceeds on from step 1308 to step 1310. In step 1310 the controller 508 directs the communications bus 506 to cease energizing the coil 1200 and to thereby cause the arm 904 to stop applying compressive force toward the drag block spring 908. The third system 900 proceeds from step 1310 to step 1312 to determine whether to execute another loop of steps 1302 to step 1310 or to proceed on to alternate computational operations of step 1314.

Figure 14A:
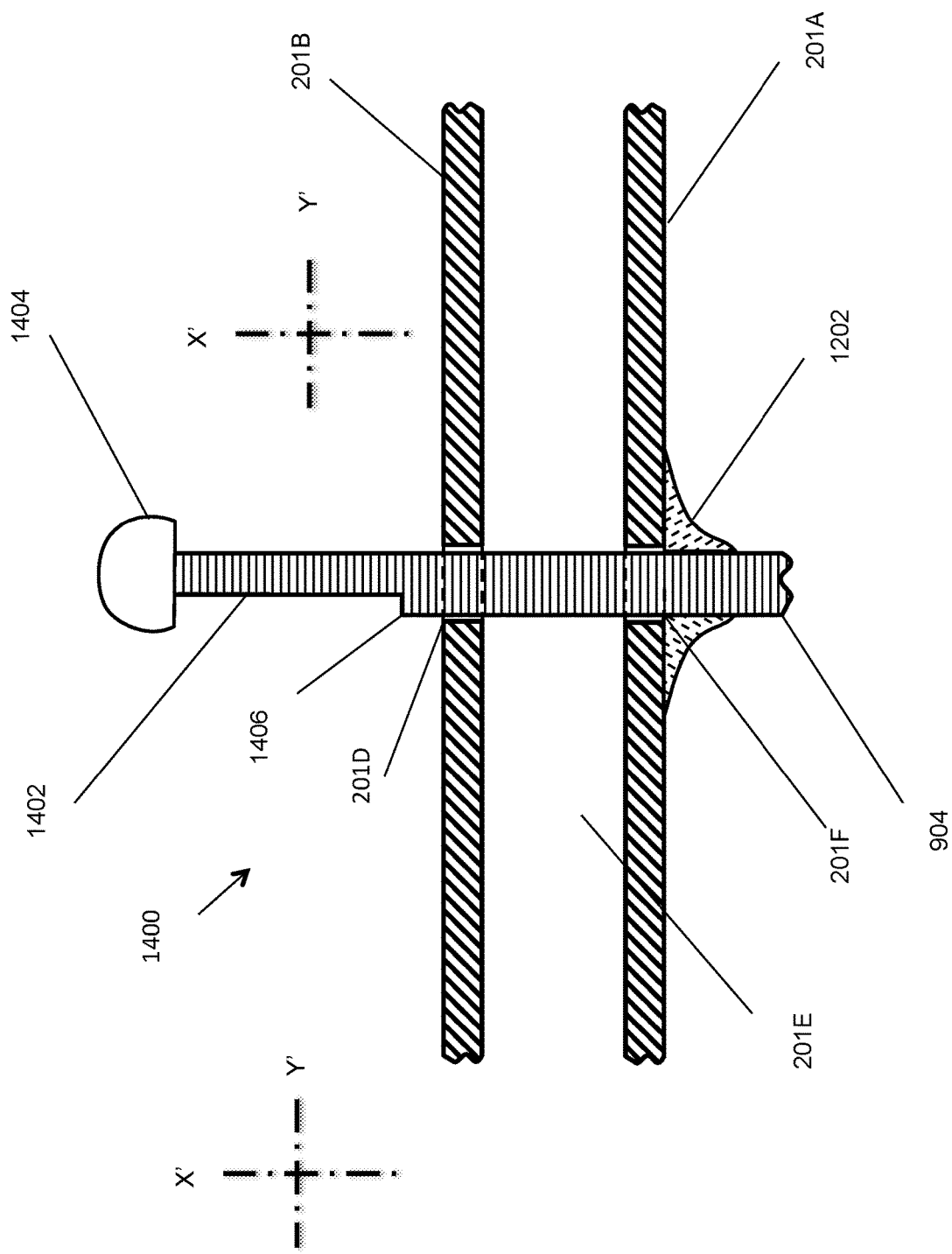
FIG. 14A is a block diagram of an alternate manual control module coupled with the arm of FIG. 9 and allowing the alternate deployable drag block of FIG. 9 to reside in the deployed state.

Referring now generally to the Figures and particularly to FIG. 14A, FIG. 14A is a block diagram of an alternate manual control module 1400 (hereinafter, "manual control arm" 1400) coupled with the arm 904 and allowing the alternate deployable drag block 906 to reside in the deployed state. The manual control arm 1400 includes an arm extension 1402 that is attached at one end to the arm 904. The arm extension 1402 includes a notch 1406. A manual grip fixture 1404 is attached the arm extension 1402 at a second end. The arm extension 1402 extends through an oversized outer aperture 201D of the exterior side plate 201B of the housing 201 and into an interior 201E of the housing 201. It is understood that the exterior side plate 201B is preferably outside of the hose bib 104 when the third system 900 is attached to the hose bib 104.

Figure 14B:
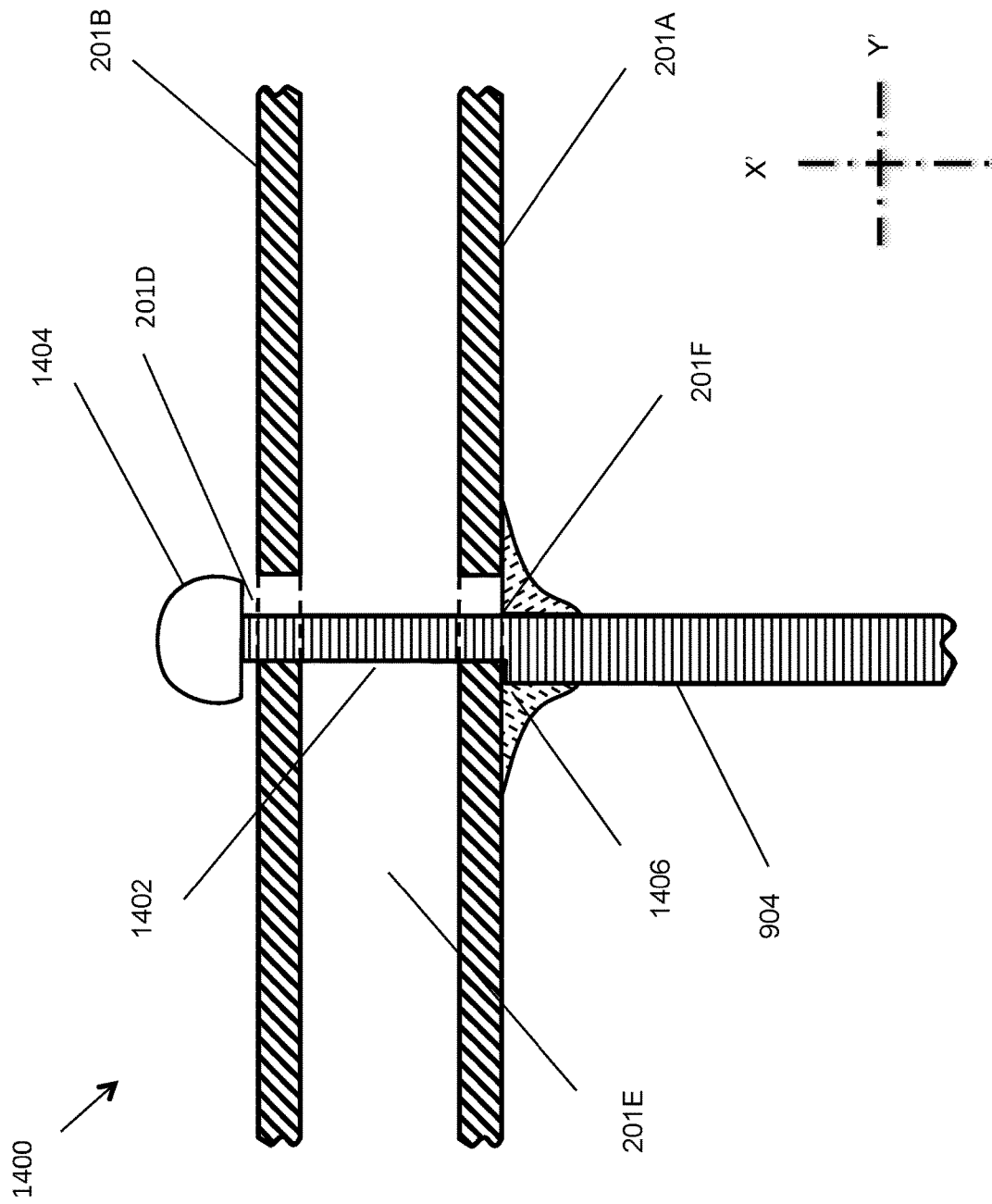
FIG. 14B is a block diagram of an alternate manual control module coupled with the arm of FIG. 9 and driving the alternate deployable drag block of FIG. 9 into the insertion state.

Referring now generally to the Figures and particularly to FIG. 14B, FIG. 14B is a block diagram of the alternate manual control module 1400 coupled with the arm 904 and driving the alternate deployable drag block 906 into the insertion state. As shown in FIG. 14B, the notch 1406 is sized and shaped to enable a detachable catch of the notch 1406 against the hose side plate 201A and within an oversized housing aperture 201F. Both oversized apertures 201D & 201F allow a user (not shown) to manipulate the manual grip fixture 1404 along both an X'-axis and a Y'-axis to enable catching and detaching the notch 1406 with the hose side plate 201A and to thereby alternately (a.) cause the arm 904 to press against the drag block inner arm 914 when the notch 1406 is caught by the hose side plate 201A and thereby drive the deployable drag block 906 to assume the insertion state of FIG. 10A, and (b.) release the arm 904 from pressing against the drag block inner arm 914 and thereby allow the deployable drag block 906 to transition into the deployed state of FIG. 11A.

Figure 15:
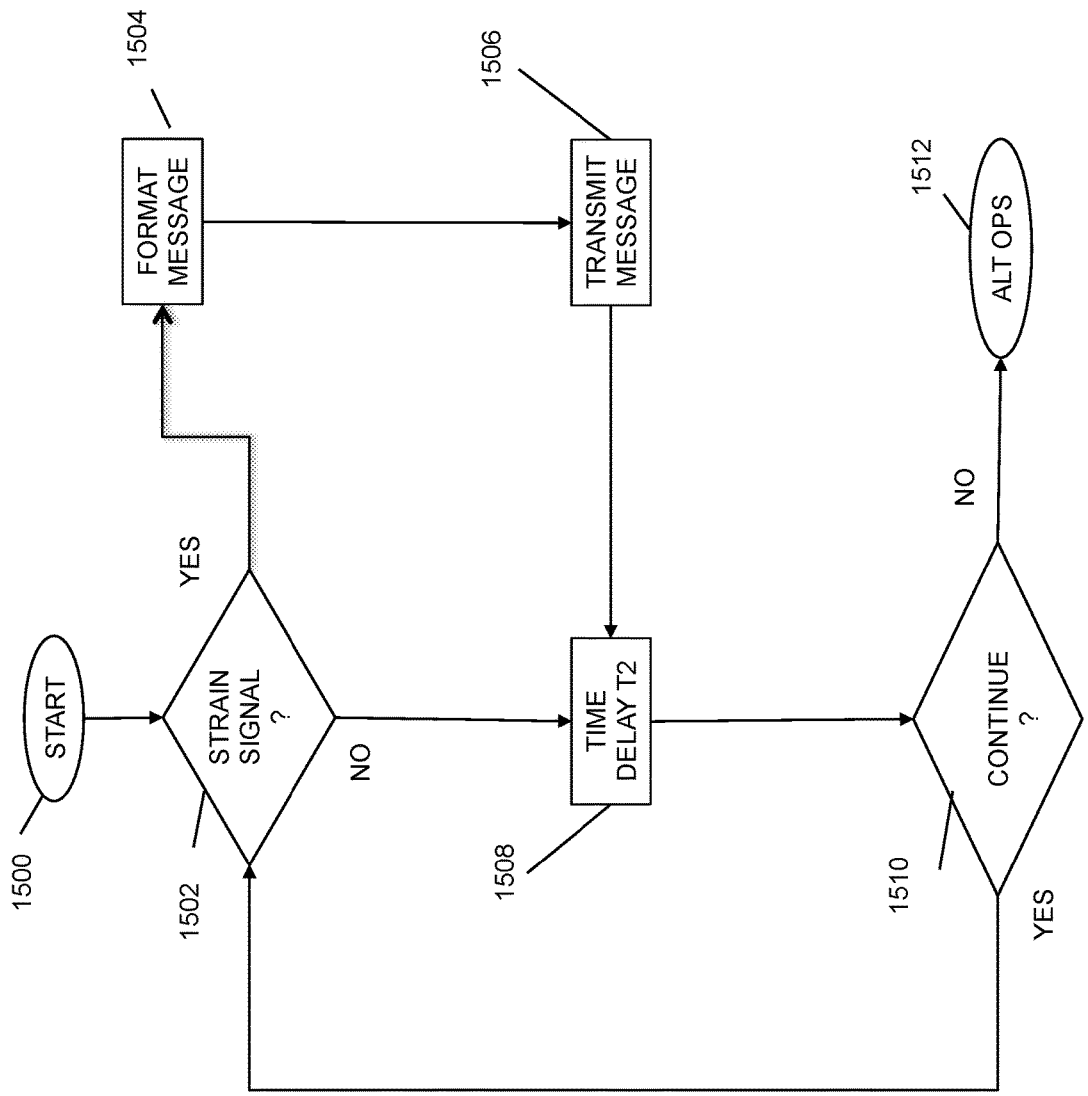
FIG. 15 is a flow chart of the controller of the second system of FIG. 5 in communicating a strain measurement value.

Referring now generally to the Figures and particularly to FIG. 15, FIG. 15 is a flow chart of the controller of the second system 500 in communicating a strain measurement value received by the controller 508 from the strain to flow converter 305. In step 1500 the second system 500 powers up and enables the controller 508 to detect signals transmitted via the communications bus 506. In step 1502 the controller 508 determines whether a strain signal measurement value has been received from the strain to flow converter 305 via the communications bus 506. When the controller 508 determines in step 1502 that a strain signal measurement value has been received from the strain to flow converter 305 via the communications bus 506, the controller 508 proceeds on to step 1504 and formats a message containing the received strain signal measurement value, and thereafter directs wireless communications transceiver 510 to wirelessly transmit the message of step 1504. The second system 500 proceeds from step 1506 to step 1508 and counts down a second time delay value T2 by application of a real time clock (not shown) of the controller 508

In the alternative, when the controller 508 determines in step 1502 that a strain signal measurement value has not been received from the strain to flow converter 305 via the communications bus 506, the controller 508 proceeds on from step 1502 to step 1508. The second system 500 proceeds from step 1508 to step 1510 to determine whether to execute another loop of steps 1502 to step 1510 or to proceed on to alternate computational operations of step 1512.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While selected embodiments have been chosen to illustrate the invented system, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

We claim:

1. A device comprising:
 a tensile force detector, the tensile force detector adapted to detect tensile force and emit an electrical signal upon tensile force detection; and
 a drag block, the drag block coupled with the tensile force detector, the drag block sized and shaped for insertion into a fluid piping while maintaining a clearance radius from an internal wall of the fluid piping, wherein the drag block is deformable upon receipt of a control signal.

2. The device of claim 1, the tensile force detector further comprising:
 a strain sensor coupled with the drag block, the strain sensor emitting the electrical signal upon detection of tensile force; and
 a signal pathway, the signal pathway coupled with the strain sensor and providing a pathway of the electrical signal toward an exterior of the device.

3. The device of claim 1, the tensile force detector further comprising:
 a strain sensor coupled with the drag block, the strain sensor emitting the electrical signal upon detection of tensile force;
 a strain to flow converter, the strain to flow converter communicatively coupled with the strain sensor and deriving a measurement datum from the electrical signal received from the strain sensor; and
 a signal pathway, the signal pathway coupled with the strain to flow converter and providing a pathway of the measurement datum toward an exterior of the device.

4. The device of claim 3, further comprising a housing, the housing at least partially enclosing the strain sensor and the strain to flow converter.

5. The device of claim 3, further comprising a tether, the tether having a first tether end coupled with the strain sensor and a second tether end coupled with the drag block, and the tether transferring tensile force from the drag block to the strain sensor.

6. The device of claim 5, further comprising a housing, the housing at least partially enclosing the strain sensor and the strain to flow converter.

7. The device of claim 6, the housing further comprising an attachment feature adapted to attach the housing with a hose bib, wherein the hose bib is coupled with the fluid piping and enables a placement of the drag block there through.

8. The device of claim 3, further comprising an electrical energy battery coupled with the strain sensor and the strain to flow converter and providing electrical energy to the strain sensor and the strain to flow converter.

9. The device of claim 3, further comprising an electrical energy pathway coupled with the strain sensor and the strain to flow converter and electrical energy pathway providing electrical energy received from a source external to the fluid piping and to the strain sensor and the strain to flow converter.

10. The device of claim 9, further comprising a solar energy converter coupled with the electrical energy pathway, the solar energy converter converting light energy into electrical power and delivering the electrical power via the electrical energy pathway to the strain sensor and the strain to flow converter.

11. The device of claim 9, further comprising a wind energy converter coupled with the electrical energy pathway, the energy converter converting wind force into electrical power and delivering the electrical power via the electrical energy pathway to the strain sensor and the strain to flow converter.

12. The device of claim 3, further comprising a wireless communications interface, the wireless communications interface communicatively coupled with the signal pathway and transmitting the received electrical signal by a wireless energy mode.

13. The device of claim 12, wherein the wireless energy mode is in accordance with a wireless communications standard selected from the standard group consisting of a cellular telephone SMS standard, a Wi-Fi® standard, and a Bluetooth® standard.

14. A device comprising:
- a drag block, the drag block sized and shaped for insertion into a fluid piping while maintaining a clearance radius from an internal wall of the fluid piping, wherein the drag block is deformable upon receipt of a control signal;
- a strain sensor coupled with the drag block, the strain sensor emitting an electrical signal derived from a magnitude of tensile force received from the drag block;
- a tether disposed between the drag block and the strain sensor, the tether coupled at a first tether end with the strain sensor and at a second tether end to the drag block, and the tether transferring the magnitude of tensile force from the drag block and to the strain sensor;
- a strain to flow converter, the strain to flow converter communicatively coupled with the strain sensor and deriving a measurement datum from the electrical signal received from the strain sensor; and
- a controller, the controller communicatively coupled with both the drag block and the strain to flow converter, and the controller adapted to provide the control signal to deform the drag block.

15. The device of claim 14, wherein the device further comprises a deploying feature to deploy the drag block within the fluid piping upon receipt of the control signal, wherein the deploying feature is communicatively coupled with the controller.

16. The device of claim 14, further comprising:
- a signal pathway, the signal pathway coupled with the strain to flow converter; and
- a wireless communications interface, the wireless communications interface communicatively coupled with the signal pathway and receiving the control signal by a wireless energy mode and providing the control signal to the controller.

17. The device of claim 16, wherein the wireless energy mode is in accordance with a wireless communications standard selected from the standard group consisting of a cellular telephone SMS standard, a Wi-Fi® standard, and a Bluetooth® standard.

18. A method comprising:
installing a device partially within an internal wall of a fluid piping, the device comprising:
- a tensile force detector, the tensile force detector adapted to detect tensile force and emit an electrical signal upon tensile force detection;
- a wireless communications interface, the wireless communications interface communicatively coupled with the tensile force detector and transmitting the received electrical signal by a wireless energy mode; and
- a drag block, the drag block coupled with the tensile force detector, the drag block sized and shaped for insertion into a fluid piping while maintaining a clearance radius from the internal wall of the fluid piping, and communicating the electrical signal from the wireless communications interface, wherein the drag block is deformable upon receipt of a control signal.

* * * * *